(12) United States Patent
Cormier et al.

(10) Patent No.: US 11,307,413 B2
(45) Date of Patent: Apr. 19, 2022

(54) SYSTEMS, DEVICES, AND METHODS FOR EYEBOX EXPANSION IN WEARABLE HEADS-UP DISPLAY

(71) Applicant: GOOGLE LLC, Mountain View, CA (US)

(72) Inventors: John Cormier, Waterloo (CA); Laleh Mokhtarpour, Kitchener (CA); Sylwia Agnieszka Lyda, Waterloo (CA); I-Hsiang Albert Chen, Toronto (CA)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 16/290,519

(22) Filed: Mar. 1, 2019

(65) Prior Publication Data
US 2019/0271845 A1 Sep. 5, 2019

Related U.S. Application Data

(60) Provisional application No. 62/637,058, filed on Mar. 1, 2018, provisional application No. 62/680,449, filed on Jun. 4, 2018.

(51) Int. Cl.
*G02B 27/01* (2006.01)
*G06F 3/01* (2006.01)
*G06F 1/16* (2006.01)
*G06F 3/0484* (2022.01)

(52) U.S. Cl.
CPC ......... *G02B 27/0172* (2013.01); *G06F 1/163* (2013.01); *G06F 3/011* (2013.01); *G06F 3/0484* (2013.01); *G02B 2027/0174* (2013.01); *G02B 2027/0178* (2013.01)

(58) Field of Classification Search
CPC .................... G02B 2027/0174; G02B 27/0172
See application file for complete search history.

(56) References Cited

U.S. PATENT DOCUMENTS

| | | | | |
|---|---|---|---|---|
| 4,959,283 A * | 9/1990 | Smothers | ................ | G03F 7/001 430/1 |
| 5,179,630 A * | 1/1993 | Chang | ...................... | G02B 5/32 359/15 |
| 5,243,449 A * | 9/1993 | Smith | .................... | B60Q 1/302 340/479 |
| 5,714,750 A * | 2/1998 | Eastman | ................ | G02B 26/10 235/454 |
| 2007/0070504 A1* | 3/2007 | Akutsu | .............. | G02B 27/4272 359/573 |

* cited by examiner

*Primary Examiner* — Kent W Chang
*Assistant Examiner* — Chayce R Bibbee

(57) ABSTRACT

Systems, devices, and methods for eyebox expansion in wearable heads-up display are described. The eyebox of a wearable heads-up display may be expanded by increasing the bandwidth of the hologram comprising the holographic combiner of the wearable heads-up display. The bandwidth of the hologram may be increased by physically coupling a donor film to a hologram film, causing donor material to diffuse into the hologram film and then fixing the donor material in place. Diffusion of donor material into the hologram film causes a change in the slant angle and/or the spacing of at least a portion of the hologram fringes of the hologram film, broadening the bandwidth of the hologram.

25 Claims, 8 Drawing Sheets

SYSTEMS, DEVICES, AND METHODS FOR EYEBOX EXPANSION IN WEARABLE HEADS-UP DISPLAY

TECHNICAL FIELD

The present systems, devices, and methods generally relate to holograms and particularly relate to holograms with controllably broadened bandwidth.

BACKGROUND

Description of the Related Art

Holograms

A hologram is a recording of a light field, with a typical light field comprising a pattern of optical fringes generated by interference between two beams of laser light. The hologram is made up of physical fringes, where physical fringes comprise variations in the refractive index or absorbance of the holographic recording medium.

During hologram playback, at least a portion of the light field used to record a hologram may be recreated by illuminating the hologram with laser light. If the laser light comprises the same wavelength and angle as the first beam of laser light used to record the hologram, and the fringes have not been altered after recording, the holographic medium will diffract laser light with the same angle and pattern as the second beam of laser light used to record the hologram. The intensity of the diffracted light is determined by the efficiency of the hologram, where the efficiency of the hologram is the fraction of the light of the first beam of laser light that is diffracted in the direction of the second beam of laser light; hologram efficiency may be in a range from 0-100%. The efficiency of a hologram depends on both the angle and the wavelength of light used to illuminate the holographic medium. Multiple holograms may be recorded in a single holographic recording medium, the multiple holograms comprising a multiplexed hologram.

Hologram Recording

A pattern of optical fringes may be generated by the interference of two beams of laser light; the two beams of laser light may be created by splitting a single beam of laser light. The two beams of laser light are typically referred to as the object beam and the reference beam. Hologram recording is typically designed such that, during playback, the recorded hologram is illuminated with laser light recreating the reference beam and the object beam is then replicated by the hologram.

Holograms are recorded in a holographic recording medium which may be a silver halide photographic emulsion, dichromated gelatin, photopolymer, or other physical media. Silver halide emulsions record a hologram as a pattern of absorbance and reflectance of light. Dichromated gelatin and photopolymer both record a hologram as a pattern of varying refractive index. Recording a hologram as a pattern of refractive index is advantageous since all of the illuminating laser light may theoretically leave the hologram; no light is necessarily absorbed by the hologram.

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a temporal pattern of laser light and usually at least one controllable mirror is used to spatially distribute the modulated temporal pattern of laser light over a two-dimensional area of another object. The spatial distribution of the modulated temporal pattern of laser light produces a series of images at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A hologram with controllably broadened bandwidth may be summarized as comprising: a first surface; a second surface opposite the first surface; and a set of fringes disposed between the first surface and the second surface, wherein: the set of fringes possess a first Bragg angle nearest the first surface; the set of fringes possess a second Bragg angle nearest the second surface; and the Bragg angle of the fringes varies between the first surface to the second surface. The hologram may possess an angular bandwidth of at least 18.5 degrees when illuminated with laser light with a wavelength equal to the center wavelength of the hologram.

The set of fringes may possess a first slant angle nearest the first surface; the set of fringes may possess a second slant angle nearest the second surface; and the slant angle of the fringes of the set of fringes may vary between the first surface to the second surface. The set of fringes may possess a first fringe spacing nearest the first surface; the set of fringes may possess a second fringe spacing nearest the second surface; and the fringe spacing of the fringes of the set of fringes may vary between the first surface to the second surface. The hologram may further include: a donor material, wherein the fringes of the set of fringes that are nearest the first surface may include a first concentration of donor material and the fringes of the set of fringes that are nearest the second surface may include a second concentration of donor material. The first concentration of donor material may be less than the second concentration of donor material. The hologram may further include: a photopolymer material, wherein the first concentration of donor material may be less than a concentration of photopolymer material at the first surface. The hologram may include a wavelength-multiplexed hologram. The wavelength-multiplexed hologram may include a red hologram, a green hologram, and a blue hologram.

An apparatus for controllable broadening of the bandwidth of a hologram may be summarized as including: a hologram film comprising hologram fringes; a donor film comprising donor material physically coupled to the hologram film; at least one laser light source, wherein each laser light source is positioned at a respective illumination angle and arranged to illuminate the hologram with a respective beam laser light, wherein each beam of laser light has a respective incident angle at which the respective beam of laser light is incident to the hologram film; at least one light sensor, wherein each light sensor is positioned at a respective playback angle and arranged to measure the intensity of laser light played back by the hologram at each respective playback angle; and a curing lamp positioned and oriented to illuminate the hologram film with light of a wavelength or range of wavelengths capable of curing the hologram film.

Each of the at least one laser light sources may comprise a multiple-wavelength laser light source. Each of the at least one light sensors may comprise a single-wavelength light sensor. The hologram film may comprises a wavelength-multiplexed hologram film. The donor material of the donor film may not be sensitive to the laser light emitted by the at least one laser light source. The apparatus may further comprise a temperature sensor. The apparatus may further comprise a heat source sufficiently adjacent proximate to the hologram film and the donor film to increase the temperature of at least one of: the hologram film and the donor film. The apparatus of claim B5 may further comprise: a cold source sufficiently adjacent proximate to the hologram film and the donor film to decrease the temperature of at least one of: the hologram film and the donor film.

A method for controllable broadening of a bandwidth of a hologram may be summarized as including: physically coupling a donor film to a hologram film, wherein the donor film comprises donor material, the hologram film comprises a hologram, and wherein physically coupling a donor film to a hologram film causes a first amount of donor material to diffuse from the donor film into the hologram film; monitoring a bandwidth of the hologram of the hologram film until a first amount of bandwidth broadening has occurred; in response to achieving the first amount of bandwidth broadening: fixing the first amount of donor material; and physically de-coupling the donor film from the hologram film.

Physically coupling a donor film to the hologram film may include forming an interface between the donor film and the hologram film to cause the first amount of donor material to diffuse from the donor film across the interface into the hologram film. The donor material may comprise curable donor material, and fixing the hologram film may include curing the curable donor material. The hologram film may comprise a first photopolymer film, the donor film may comprise a second photopolymer film, and physically coupling a donor film to the hologram film may include physically coupling the second photopolymer film to the first photopolymer film. Monitoring the bandwidth of the hologram may include illuminating the film with laser light with at least one incident angle and measuring the intensity of the laser light diffracted by the hologram at least one angle.

Monitoring the bandwidth of the hologram may include illuminating the film with laser light with at least one wavelength. Illuminating the film with laser light with at least one wavelength may include illuminating the film with laser light of a wavelength to which the donor material is insensitive. The method may further include: monitoring the intensity of laser light diffracted by the hologram film at least one angle. The method may further include: monitoring the intensity of laser light diffracted by the hologram film at least one wavelength. The hologram film may comprise at least one plane-wave sub-hologram, and monitoring the bandwidth of the hologram within the hologram film may include monitoring the bandwidth of the at least one plane-wave sub-hologram. The method may further include: bleaching the hologram film. The hologram film may comprise a wavelength-multiplexed hologram, and monitoring the bandwidth of the hologram of the hologram film until a first amount of bandwidth broadening has occurred may include monitoring the bandwidth of each wavelength-specific hologram comprising the hologram film until a respective first amount of bandwidth broadening has occurred for each wavelength specific hologram comprising the hologram film.

The method may further include: physically coupling an additional donor film to the hologram film to cause a second amount of donor material to diffuse from the donor film into the hologram film; monitoring the bandwidth of the hologram of the hologram film until a second amount of bandwidth broadening has occurred; in response to achieving the second amount of bandwidth broadening: fixing the second amount of donor material; and physically de-coupling the additional donor film from the hologram film. The method may further include: heating at least one of: the hologram film and the donor film. The method may further include: cooling at least one of: the hologram film and the donor film. The method may further include: monitoring the temperature of at least one of: the hologram film and the donor film.

An eyeglass lens for use in a wearable heads-up display may be summarized as comprising: a hologram comprising: a first surface; a second surface opposite the first surface; and a set of fringes disposed between the first surface and the second surface; and at least one lens portion, wherein each lens portion is physically coupled to the hologram, and wherein: the set of fringes possess a first Bragg angle nearest the first surface; the set of fringes possess a second Bragg angle nearest the second surface; and the Bragg angle of the set of fringes varies between the first surface to the second surface.

The hologram may possess an angular bandwidth of at least 18.5 degrees when illuminated with laser light with a wavelength equal to the center wavelength of the hologram. The set of fringes may possess a first fringe spacing nearest the first surface; the set of fringes may possess a second fringe spacing nearest the second surface; and the fringe spacing of the fringes of the set of fringes may vary between the first surface to the second surface. The eyeglass lens may further comprise: donor material, wherein the fringes of the set of fringes nearest the first surface may comprise a first concentration of donor material and the fringes of the set of fringes nearest the second surface may comprise a second concentration of donor material. The eyeglass lens may further comprise: photopolymer material, wherein the first concentration of donor material may be less than the concentration of photopolymer material at the first surface and wherein the second concentration of donor material may be greater than the concentration of photopolymer material at the second surface. The set of fringes may comprise a wavelength-multiplexed hologram. The wavelength-multiplexed hologram may comprise a red hologram, a green hologram, and a blue hologram.

A wearable heads-up display (WHUD) with an expanded eyebox may be summarized as comprising: a support structure; a projector; and a transparent combiner positioned and oriented to appear in a field of view of an eye of a user when the support structure is worn on a head of the user, the transparent combiner comprising: a hologram comprising: a first surface; a second surface opposite the first surface; and a set of fringes disposed between the first surface and the second surface; and at least one lens portion, wherein each lens portion is physically coupled to the, and wherein: the set of fringes possess a first Bragg angle nearest the first surface; the set of fringes possess a second Bragg angle nearest the second surface; and the Bragg angle of the set of fringes varies between the first surface to the second surface.

The set of fringes may be characterized by a first fringe spacing nearest the first surface; the set of fringes may be characterized by a second fringe spacing nearest the second surface; and a spacing of the fringes of the set of fringes may vary between the first surface to the second surface. The hologram may further comprise donor material, and the fringes of the set of fringes that are nearest the first surface may comprise a first concentration of donor material and the fringes of the set of fringes that are nearest the second surface may comprise a second concentration of donor material. The hologram may further comprise a photopolymer material, and the first concentration of donor material may be less than the concentration of photopolymer material at the first surface and the second concentration of donor material may be greater than the concentration of photopolymer material at the second surface. The set of fringes may comprise a wavelength-multiplexed hologram. The wavelength-multiplexed hologram may comprise a red hologram, a green hologram, and a blue hologram. The hologram may possess a total two-dimensional angular bandwidth of 18.5 degrees when illuminated with laser light with a wavelength equal to a center wavelength of the hologram. The projector may include an optical element arranged to replicate an image generated by the projected into at least two exit pupils, wherein each exit pupil may originate from a respective one of N effective projector positions; each the N effective projector positions may be positioned within a total two-dimensional angular range θ of the hologram; and θ is less than 18.5 degrees. The projector may include an optical element arranged to steer an exit pupil within a total two-dimensional angular range θ of the hologram, and θ is less than 18.5 degrees.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
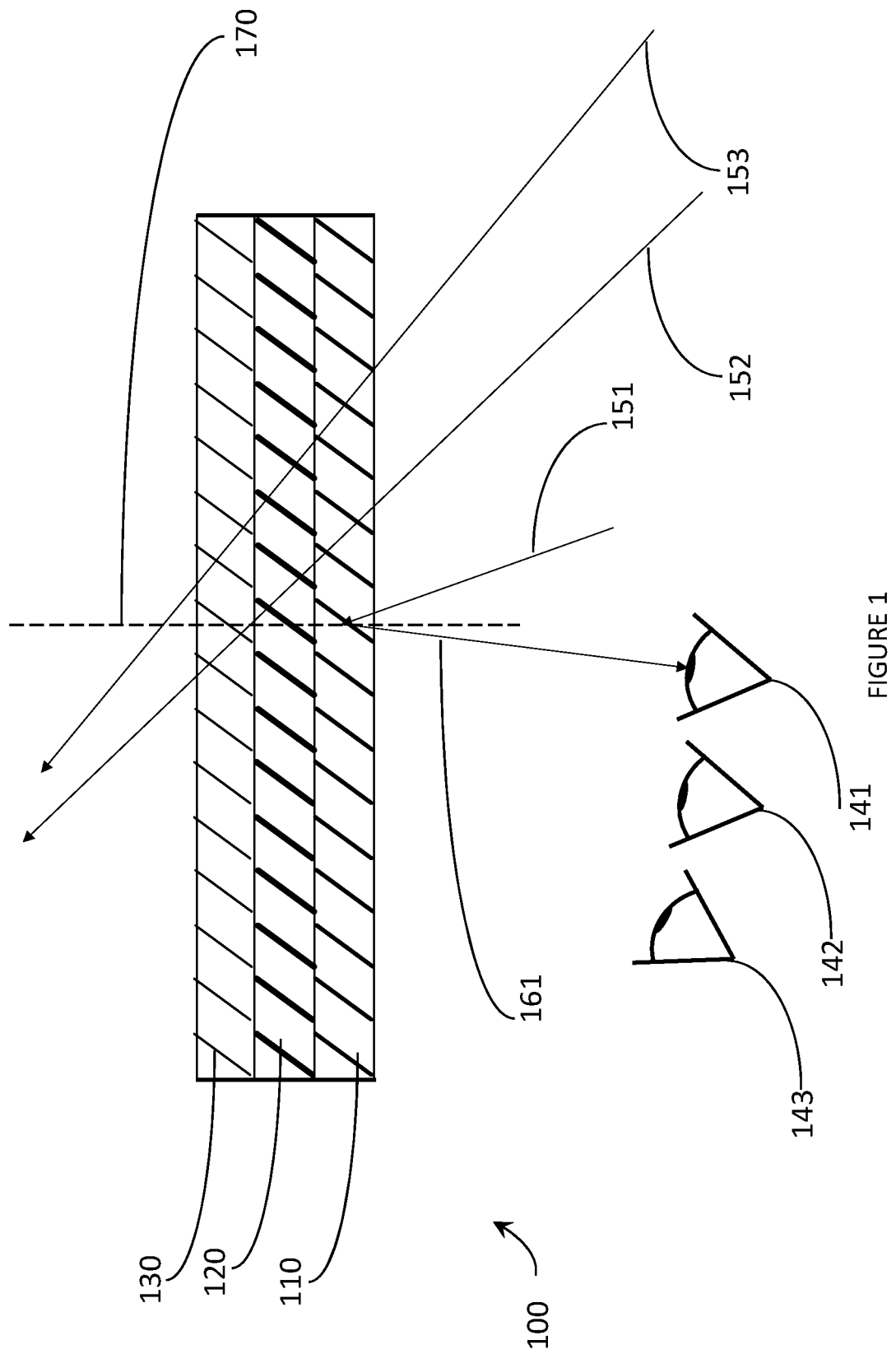
FIG. 1 is a cross-sectional view of un-swollen hologram in accordance with the present systems, devices, and methods, and illustrating a number of exemplary exit pupils associated therewith.

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations and the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations or the embodiments.

The various implementations or embodiments described herein provide systems, devices, and methods for controllable bandwidth broadening of a hologram that, among other potential applications, have particular utility in eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure, the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In the alternative, the eyebox of a scanning laser-based WHUD may be expanded by redirecting a single relatively small exit pupil between multiple potential eyebox locations, wherein the multiple potential eyebox locations are spatially distributed over a relatively larger area of the user's eye, compared to the area of the single exit pupil fixed in a single location. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user.

The laser light generated by the projector will impinge on the holographic combiner at an angle determined by the effective position of the projector relative to the holographic combiner. An effective projector position may be a real projector position or a virtual projector position. A virtual projector position is the position from which projector light appears to originate from due to redirection of the projector light by an optical element (e.g., a splitter optic). The laser light is then redirected by the holographic combiner to converge at or near an area proximate to the eye of the user, i.e., the exit pupil. The angle at which the laser light impinges on the holographic combiner determines the position of the exit pupil. The effective position of the projector determines the angle at which the laser light impinges on the holographic combiner, therefore the position of a given exit pupil is determined by the effective position of the projector.

The spatial distribution of multiple copies or instances of the exit pupil, or in the alternative the spatial distribution of multiple potential eyebox locations, may be achieved through the use of N effective projector positions, wherein each of the N effective projector positions corresponds to one of N exit pupils. Switching between real projector positions may be accomplished by, for example, pitching, yawing, or displacing the projector. Optically replicating or repeating a relatively small exit pupil and spatially distributing multiple copies or instances of the exit pupil over a relatively larger area of the user's eye may be effected through the use of multiple virtual projector positions as described in U.S. Provisional Patent Application Ser. No. 62/501,587.

The area of the holographic combiner impinged upon by laser light generated by the projector for a given exit pupil may overlap significantly with the area of the holographic combiner impinged upon by laser light generated by the projector for any number of other exit pupils, where the angle if the impinging laser light differs for each exit pupil. It is advantageous that the holographic combiner possesses sufficient angular bandwidth such that the holographic combiner is able to efficiently redirect light into the eye of the user regardless of the impinging angle of the laser light.

The bandwidth of a hologram is the range of angles and wavelengths of incident laser light that the hologram efficiently diffracts; bandwidth includes angular bandwidth and wavelength bandwidth. The bandwidth of a hologram may be expressed as a discrete quantity of wavelength (e.g., X nm) or angle (e.g., Y degrees) that is efficiently diffracted by the hologram. Hologram efficiency measurements include at least some amount of experimental noise, and the measurement systems may vary between laboratories or experimenters, thus there exists no universally agreed upon definition of "efficient diffraction" in the art. Non-exclusive examples of methods used to calculate the bandwidth of a hologram include: fitting the diffraction efficiency data to a curve and integrating under said curve, determining the range of wavelengths and/or angles for which the efficiency of a hologram is above a given efficiency threshold (1%, 5%, 10%, etc.), or determining the full-width half-max (FWHM) of the efficiency of the hologram. Determination of the FWHM of the efficiency of the hologram is typically the simplest and most repeatable method of determining bandwidth. The center wavelength of the hologram may be defined as the wavelength at the center of the hologram bandwidth as determined using the FWHM of the efficiency of the hologram.

The angular bandwidth of a hologram is the range of angles of incident laser light that satisfies the Bragg condition for the hologram and therefore may be efficiently diffracted by the hologram. The wavelength bandwidth of a hologram is the range of wavelengths of incident laser light that satisfies the Bragg condition for the hologram and therefore may be efficiently diffracted by the hologram. Typically, a hologram with a narrow angular bandwidth also possesses a narrow wavelength bandwidth and a hologram with a broad angular bandwidth also possesses a broad wavelength bandwidth. Any process that increases or decreases the angular bandwidth of a hologram will typically also proportionally increase or decrease (respectively) the wavelength bandwidth of a hologram. A person of skill of art will appreciate that the term "bandwidth" therefore may refer either to the angular bandwidth or the wavelength bandwidth of a hologram unless otherwise specified as "angular bandwidth" or "wavelength bandwidth".

The holographic combiner may advantageously comprise a volume hologram since volume holograms typically possess higher efficiencies than thin holograms. However, a typical volume hologram has a narrow angular bandwidth, i.e., there is a limited range of angles that satisfy the Bragg condition for hologram playback, that would thereby limit the size of the eyebox of the WHUD comprising a volume hologram as a holographic combiner. In other words, a hologram with a small angular bandwidth necessitates a smaller eyebox, while a hologram with an increased angular bandwidth would have an expanded eyebox. There is a need in the art for a hologram with high efficiency and high bandwidth.

Alternatively, the field of view (FOV) of a light guide-based WHUD depends on the angular bandwidth of the incoupler and outcoupler of the light guide-based WHUD. The incoupler of a light guide-based WHUD redirects light from the projector into the light guide and the outcoupler redirects light out of the light guide towards the eye of the user. Typically, the angle of light entering the light guide via the incoupler is equal to the angle of light exiting the outcoupler, so the angular bandwidths of the incoupler and outcoupler are typically the same. The projector may scan across a range of angles to generate a display image, however the incoupler and outcoupler can only function efficiently if said range of angles remains within the angular bandwidth of the incoupler and the outcoupler. In other words, the FOV of a light guide-based WHUD increases as the angular bandwidth of the incoupler and the outcoupler increases, and a wider FOV is generally advantageous.

The incoupler and the outcoupler of a light guide-based WHUD may be holograms, which provides various advantages over the typical alternative incoupler/outcoupler technology which are to surface-relief gratings (SRGs). Compared to SRGs, holograms provide higher wavelength selectivity and drastically reduced chromatic dispersion. Additionally, while SRGs typically interact with light across multiple orders, holograms typically have only a single order of interaction. Holograms therefore show reduced emission of stray light and have higher transparency across a range of viewing angles. However, as described above, typical volume holograms have narrow angular bandwidths.

The bandwidth of a hologram may be increased by selectively swelling a portion of the hologram. Swelling the hologram may increase the fringe spacing and thus increase the Bragg wavelength of the swollen portion of the hologram; alternatively, swelling the hologram may increase or decrease the slant angle of the fringes and thereby decrease or increase, respectively, the Bragg angle of the swollen portion of the hologram. A person of skill in the art will appreciate that the Bragg angle and Bragg wavelength of a hologram each depend on both the spacing and the slant angle of the fringes, thus a change in the Bragg angle of the fringes of a hologram typically also includes a change in the Bragg wavelength of same hologram and a change in the Bragg wavelength of the fringes of a hologram typically also includes a change in the Bragg angle of same hologram.

A gradient of swelling may be established within the hologram, where the fringes on a first surface of the hologram are maximally swollen, the fringes on a second surface opposite the first surface of the hologram are minimally swollen, and the swelling decreases continuously from the first to the second surface. Gradient swelling smoothly increases the Bragg wavelength of the hologram through the thickness of the hologram. Since illumination of the hologram with laser light may cause laser light to pass through the entire thickness of the hologram, at least a portion of the laser light may be diffracted by the hologram so long as some layer through the thickness of the hologram is responsive to laser light with an angle and wavelength matching the angle and wavelength of the illuminating laser light. Thus the bandwidth of a gradient swollen hologram is greater than the same hologram without gradient swelling. However, successfully applying gradient swelling to a hologram to produce a hologram with broadened angular bandwidth is a non-trivial technical challenge.

Gradient swelling may be achieved by diffusing donor material into a hologram and then fixing the donor material in place. Fixing the donor material converts the donor material from a mobile state to an immobile state, wherein donor material in an immobile state may no longer diffuse. The donor material may be a monomer material, where the monomer may be mono-functional (e.g., methyl methacrylate), bi-functional (e.g., ethylene glycol dimethacrylate) or with higher functionality (e.g., trimethylpropane triacrylate). The donor material may be fixed by curing the donor material, where curing includes photo-curing, thermal curing, or other forms of curing. Curing a monomer material converts the monomer into polymer and fixes the polymer via the formation of covalent chemical bonds; the formed covalent chemical bonds may fix the polymer by forming chemical crosslinks with the hologram or the formed covalent chemical bonds may increase the molecular weight of the polymer such that the polymer is capable of forming physical crosslinks with the hologram. Curing a monomer material may increase the mechanical strength of the hologram. Curing a monomer material may decrease the adhesive properties of the hologram.

Donor material may be diffused into a hologram by laminating together a hologram and a donor film, where a donor film comprises donor material dissolved in an inert matrix. Once the donor film and the hologram are laminated together, donor material may diffuse from the donor film into the hologram through the hologram/donor film interface. The lamination may be performed either very quickly or as part of a continuous process to make the diffusion of donor material more homogeneous across the lateral dimensions of the hologram. The lamination may be performed such that homogeneous coverage of the hologram by the donor film is achieved, which may include the intentional prevention of trapping bubbles of air between the donor film and the hologram, to ensure consistent swelling across the lateral dimensions of the hologram.

The magnitude and slope of the swelling gradient through the depth of the film depends on the thickness of the hologram and the rate of diffusion of donor material from the donor film into and through the hologram. A desired swelling gradient may be established via careful control of the diffusion rate and the time over which diffusion occurs. Non-exclusive examples of factors that affect the initial diffusion rate include the concentration of donor material in the donor film, the molecular weight of the donor material, the concentration of donor material in the hologram, the temperature of the donor film, the temperature of the hologram, the viscosity of the donor film, and the viscosity of the hologram. The viscosity of the hologram depends on the molecular weight and crosslink density of the photopolymer in the hologram which in turn depend on the curing conditions used during hologram fabrication. The diffusion rate may vary during swelling, for example the donor film may become depleted of donor material at the donor film/hologram interface if the donor film is sufficiently thin or viscous; the presence of donor material in the hologram may also plasticize the hologram thereby reducing the viscosity of the hologram.

Small variations in: the temperature during lamination, donor film thickness, concentration of donor material in the donor film, hologram thickness, hologram recording conditions, and hologram curing conditions may cause large variations in diffusion rate, either independently or cumulatively and small variations in the aforementioned parameters are typical for typical manufacturing processes. Large variation in diffusion rates negates the possibility of determining a single correct diffusion time necessary to establish a desired swelling gradient, which makes large-scale production of gradient-swollen films based on a fixed time for swelling impractical since the bandwidth of the resulting swollen holograms is not reliably controllable.

Uncontrolled bandwidth broadening of a hologram may produce a hologram with bandwidth that is higher than desired or bandwidth that is lower than desired. A hologram with a lower bandwidth than otherwise desired will not have a sufficiently expanded eyebox, while a hologram with a higher bandwidth than desired may cause ghost images to form. Uncontrollable bandwidth broadening of a hologram may produce a hologram with a playback wavelength greater than the playback wavelength of the hologram prior to bandwidth broadening, in which case the bandwidth of the resulting hologram may not be significantly broader than the bandwidth of the hologram prior to bandwidth broadening.

In accordance with the present systems, devices, and methods, controllable bandwidth broadening may be achieved by laminating together a donor film and a hologram and monitoring the bandwidth of at least a portion of the hologram fringes within the hologram. Swelling may thereby be allowed to continue long enough to achieve a desired level of bandwidth broadening; the swelling may thereafter be stopped to prevent an undesirable amount of diffusion of donor material from occurring. The controllable swelling of the hologram causes controllable bandwidth broadening of the hologram which, among other applications, makes the controllably bandwidth-broadened hologram particularly well-suited for use as a transparent holographic combiner for WHUDs with expanded eyeboxes. In other words, the present systems, devices, and methods describe eyebox expansion by controllable bandwidth broadening of holographic combiners in scanning laser-based WHUDs.

Throughout this specification and the appended claims, the term "replication" and its variants are used (e.g., in the context of "exit pupil replication") to generally refer to situations where multiple instances of substantially the same exit pupil and/or display content are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. Unless the specific context requires otherwise, references to "exit pupil replication" herein include exit pupil replication by exit pupil repetition.

FIG. 1 is a cross-sectional view of un-swollen hologram 100 in accordance with the present systems, devices, and methods. Un-swollen hologram 100 comprises first set of fringes 110, second set of fringes 120, and third set of fringes 130. First set of fringes 110, second set of fringes 120, and third set of fringes 130 have the same fringe spacing and slant angle, therefore first set of fringes 110, second set of fringes 120, and third set of fringes 130 have the same range of angles and wavelengths that satisfy the Bragg conditions for hologram playback. Un-swollen hologram may be illuminated with first beam of laser light 151, second beam of laser light 152 and third beam of laser light 153. First beam of laser light 151 satisfies the Bragg condition for wavelength and angle for first set of fringes 110 and is diffracted by first set of fringes 110 to produce first diffracted object beam 161. The angle of incidence of first beam of laser light 151 may be measured relative to normal 170. First object beam 161 converges to first exit pupil 141.

Second beam of laser light 152 may satisfy the Bragg condition for wavelength for first set of fringes 110, second set of fringes 120, and third set of fringes 130, however second beam of laser light 152 does not satisfy the Bragg condition for angle for any of first set of fringes 110, second set of fringes 120, and third set of fringes 130 and therefore second beam of laser light 152 is not diffracted by first set of fringes 110, second set of fringes 120, and third set of fringes 130; second beam of laser light 152 cannot be redirected to any of first exit pupil 141, second exit pupil 142, or third exit pupil 143. Third beam of laser light 153 may satisfy the Bragg condition for wavelength for first set of fringes 110, second set of fringes 120, and third set of fringes 130, however third beam of laser light 153 does not satisfy the Bragg condition for angle for any of first set of fringes 110, second set of fringes 120, and third set of fringes 130 and therefore third beam of laser light 153 is not diffracted by first set of fringes 110, second set of fringes 120, and third set of fringes 130; third beam of laser light 152 cannot be redirected to any of first exit pupil 141, second exit pupil 142, or third exit pupil 143.

If un-swollen hologram 100 is employed as a holographic combiner in a WHUD, the spatial distribution of exit pupils of the WHUD is limited by the narrow angular bandwidth of un-swollen hologram 100.

Figure 2:
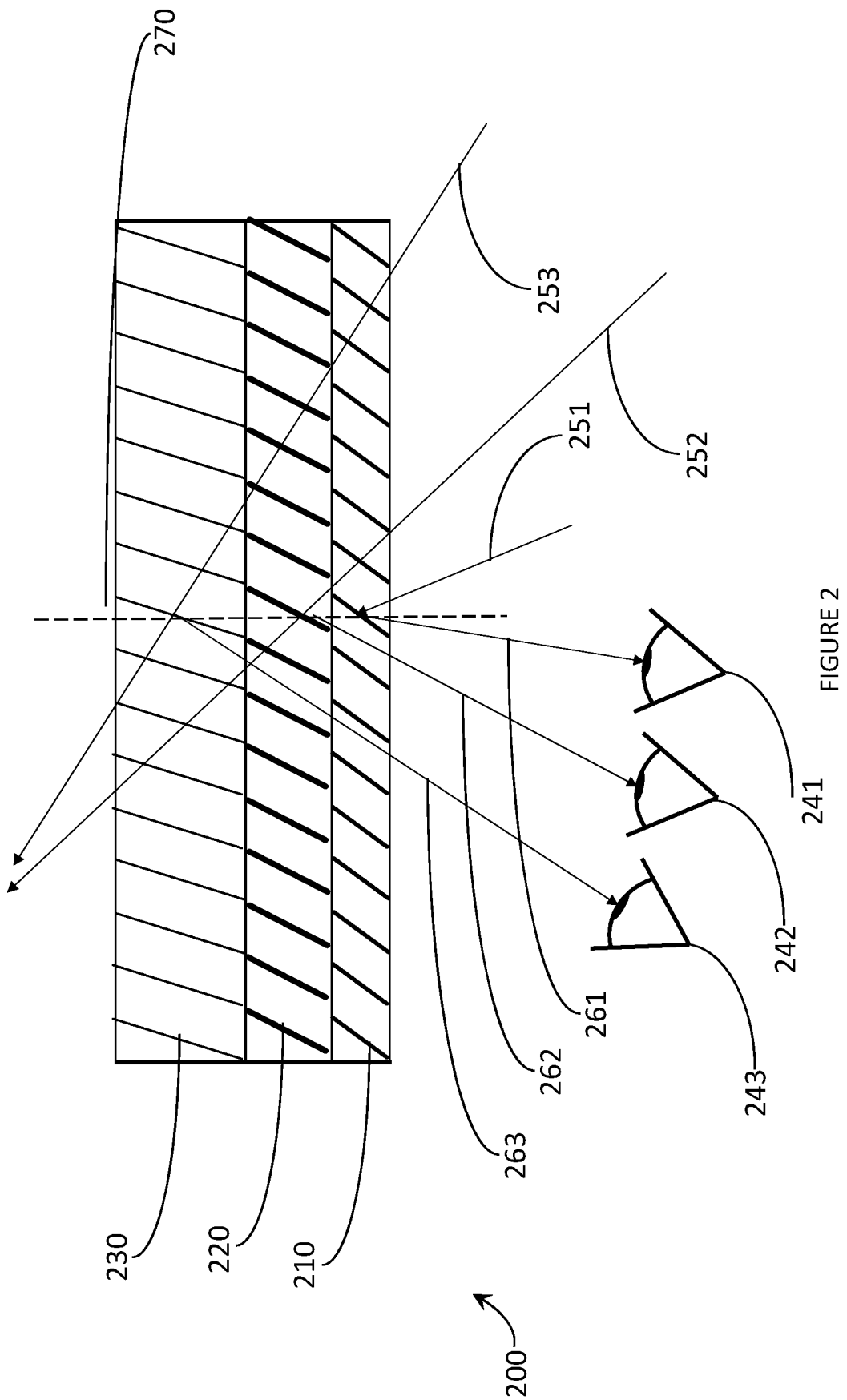
FIG. 2 is a cross-sectional view of controllably bandwidth-broadened hologram in accordance with the present systems, devices, and methods, and illustrating a number of exemplary exit pupils associated therewith.

FIG. 2 is a cross-sectional view of controllably bandwidth-broadened hologram 200 in accordance with the present systems, devices, and methods. Controllably bandwidth-broadened hologram 200 comprises first set of fringes 210, second set of fringes 220, and third set of fringes 230. Due to the controllable bandwidth broadening that was previously applied to controllably bandwidth-broadened hologram 200, first set of fringes 210, second set of fringes 220, and third set of fringes 230 do not have the same slant angle and therefore first set of fringes 210, second set of fringes 220, and third set of fringes 230 have different ranges of angles and wavelengths that satisfy the Bragg conditions for hologram playback. Controllably bandwidth-broadened hologram 200 may be illuminated with first beam of laser light 251, second beam of laser light 252 and third beam of laser light 253. First beam of laser light 251 satisfies the Bragg condition for wavelength and angle for first set of fringes 210 and is diffracted to produce first diffracted object beam 261. The angle of incidence of first beam of laser light 251 may be measured relative to normal 270. First object beam 261 converges to first exit pupil 241. First beam of laser light 251 may satisfy the Bragg condition for wavelength for second set of fringes 220 and third set of fringes 230, however first beam of laser light 251 does not satisfy the Bragg condition for angle for second set of fringes 220 and third set of fringes 230; first beam of laser light 251 will not be diffracted by second set of fringes 220 and third set of fringes 230.

Second beam of laser light 252 may satisfy the Bragg condition for wavelength for first set of fringes 210, second set of fringes 220, and third set of fringes 230, however second beam of laser light 252 does not satisfy the Bragg condition for angle for first set of fringes 210 or third set of fringes 230; second beam of laser light 252 will not be diffracted by first set of fringes 210 or third set of fringes 230. Second beam of laser light 252 does satisfy the Bragg condition for angle for second set of fringes 220 and will be diffracted by second set of fringes 220 to produce second diffracted object beam 262. Because the angle of incidence of second laser beam 252, measured from normal 270, is not equal to the angle of incidence of first beam of laser light 251 second diffracted object beam 262 may converge to exit pupil 242 rather than exit pupil 241.

Third beam of laser light 253 may satisfy the Bragg condition for wavelength for first set of fringes 210, second set of fringes 220, and third set of fringes 230, however third beam of laser light 253 does not satisfy the Bragg condition for angle for first set of fringes 210 or second set of fringes 220; third beam of laser light 253 will not be diffracted by first set of fringes 210 or second set of fringes 220. Third beam of laser light 253 does satisfy the Bragg condition for angle for third set of fringes 230 and will be diffracted by third set of fringes 230 to produce third diffracted object beam 263. Because the angle of incidence of second laser beam 253, measured from normal 270, is not equal to the angle of incidence of first beam of laser light 251 or second beam of laser light 252 third diffracted object beam 263 may converge to exit pupil 243 rather than exit pupil 241 or exit pupil 242.

For the sake of clarity, the slant angle of fringes within controllably bandwidth-broadened hologram 200 has been depicted as varying between three discrete sets of fringes in FIG. 2. However, a person of skill in the art will appreciate that the slant angle within a controllably bandwidth-broadened hologram may vary continuously through the thickness of the hologram, rather than varying between three distinct sets of fringes as depicted in FIG. 2. A continuously varying slant angle and/or fringe spacing within a hologram allows the hologram to diffract laser light from a continuum of angles; for any given angle within said continuum at least a portion of the fringes within the hologram will have Bragg conditions satisfied by the impinging beam of laser light. A discrete set of incident angles may then be chosen, where each of the incident angles satisfies the Bragg conditions of a subset of the fringes within the hologram, and each angle corresponds to a different exit pupil. The broad angular bandwidth of a controllably bandwidth broadened hologram with continuously varying fringe spacing allows a wide range of incident angles and therefore a broad spatial distribution of exit pupils for a WHUD utilizing the controllably bandwidth broadened hologram with continuously varying fringe spacing as a holographic combiner. Alternatively, a range of incident angles may be chosen, the range of angles corresponding to the FOV of a light guide-based WHUD. Each angle in the range of angles satisfies the Bragg conditions of a subset of the fringes within the hologram, and each angle corresponding to a portion of the image displayed by the light guide-based WHUD.

Figure 3:
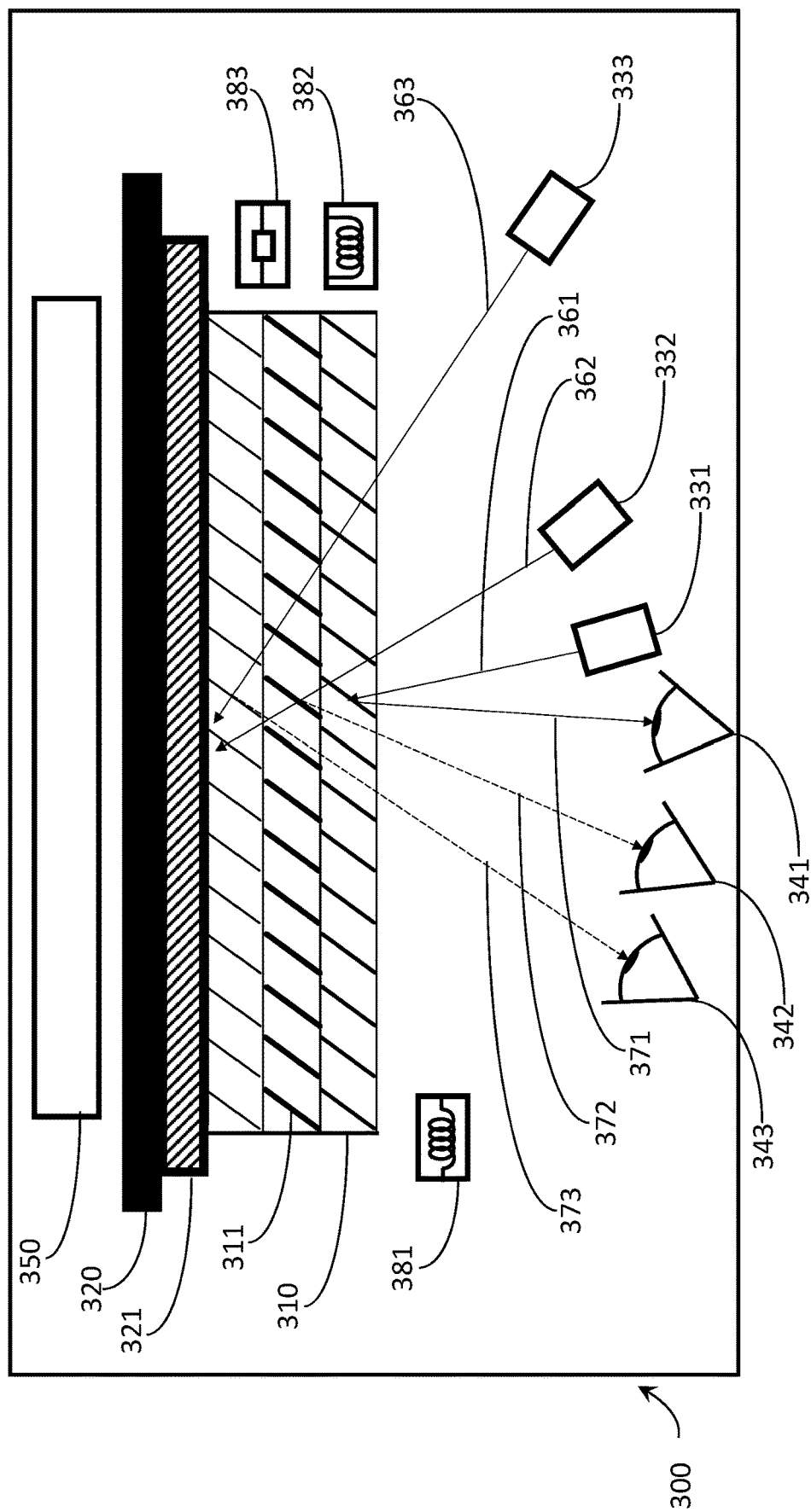
FIG. 3 is a schematic diagram of hologram controllable bandwidth broadening apparatus in accordance with the present systems, devices, and methods, and illustrating a number of exemplary exit pupils associated therewith.

FIG. 3 is a schematic diagram of hologram controllable bandwidth broadening apparatus 300 in accordance with the present systems, devices, and methods. Hologram controllable bandwidth broadening apparatus 300 comprises hologram film 310, donor film 320, first laser light source 331, second laser light source 332, third laser light source 333, first light sensor 341, second light sensor 342, third light sensor 343, and curing lamp 350.

Hologram film 310 comprises set of hologram fringes 311, wherein the spacing of set of hologram fringes 311 is consistent with the fringe spacing of the hologram fringes originally recorded in hologram film 310 throughout the depth of hologram film 310. The slant angle of the hologram fringes is consistent with the slant angle of the hologram fringes originally recorded in hologram film 310 throughout the depth of hologram film 310. Set of hologram fringes 311 is depicted in FIG. 3 as three discrete subsets of hologram fringes to more clearly illustrate the effect of controllable bandwidth broadening on hologram film 310, however a person of skill in the art of holography will appreciate that set of hologram fringes 311 could be accurately represented by a single set of fringes, a number of subsets of fringes greater than three, or a continuum of hologram fringes.

Throughout this specification and the appended claims the term "depth" refers to a distance in the z-direction, where the z direction is normal to the surface of the plane, cylinder, or sphere of the hologram film (for planar, cylindrical, and spherical holograms, respectively). Hologram film 310 may include a wavelength multiplexed hologram. A wavelength multiplexed hologram comprises at least two wavelength-specific holograms, wherein each wavelength-specific hologram has a respective wavelength bandwidth and center wavelength. A wavelength multiplexed hologram may include a red hologram, a green hologram, and a blue hologram.

Donor film 320 is physically coupled to hologram film 310. Donor film 320 comprises donor material and an inert matrix. A donor material is a material capable of diffusing into a hologram and increasing the fringe spacing of at least a portion of the hologram and/or changing the slant angle of at least a portion of the hologram, where a greater amount of donor material causes a greater amount of change in slant angle and/or increase in fringe spacing. An increase in the fringe spacing of a subset of hologram fringes 311 within a portion of hologram film 310 will increase the playback wavelength of said subset of hologram fringes 311 within said portion of hologram film 310. A change in the slant angle of a portion of a subset of hologram fringes 311 within a portion of hologram film 310 will cause a corresponding change in the playback wavelength of said subset of hologram fringes 311 within said portion of hologram film 310. A person of skill in the art of holography will appreciate that a change in the playback wavelength of a hologram (or a portion thereof) is equivalent to a change in the playback angle of a hologram (or a portion thereof).

Donor material may comprise photosensitive material, where photosensitive material may comprise: at least one monomer, counter-diffusant, urethane oligomer, photo-initiator and co-initator. Non-exclusive examples of monomer include methyl methacrylate, ethylene glycol dimethacrylate and trimethylpropane triacrylate. Photosensitive material may be similar to the material in which the hologram was originally recorded. Donor film 320 may comprise a holographic recording medium (HRM).

First laser light source 331 generates first beam of laser light 361. First laser light source 331 is arranged at a first illumination angle to illuminate hologram film 310 with first beam of laser light 361. First laser light source 331 is positioned such that first beam of laser light 361 illuminates hologram film 310 with a first incident angle. First beam of laser light 361 is diffracted by hologram film 310 to produce first diffracted light signal 371 with a first playback angle; in other words hologram film 310 plays back first beam of laser light 361, producing diffracted light signal 371. Diffracted light signal 371 possesses a first playback angle. First light sensor 341 is positioned and oriented such that diffracted light signal 371 impinges upon first light sensor 341; in other words first light sensor 341 is positioned at a first playback angle relative to hologram film 310. The intensity of first diffracted light signal 371 is measured by first light sensor 341.

Second laser light source 332 generates second beam of laser light 362. Second laser light source 332 is arranged at a second illumination angle to illuminate hologram film 310 with second beam of laser light 362. Second laser light source 332 is positioned such that second beam of laser light 362 illuminates hologram film 310 with a second incident angle. Second beam of laser light 362 impinges on hologram film 310 at an incident angle such that hologram film 310 cannot diffract second beam of laser light 362; in other words second beam of laser light 362 impinges on hologram film 310 at an incident angle outside the angular bandwidth of hologram film 310.

Third laser light source 333 generates third beam of laser light 363. Third laser light source 333 is arranged at a third illumination angle to illuminate hologram film 310 with third beam of laser light 363. Third laser light source 333 is positioned such that third beam of laser light 363 illuminates hologram film 310 with a third incident angle. Third beam of laser light 363 impinges on hologram film 310 at an incident angle such that hologram film 310 cannot diffract third beam of laser light 363; in other words third beam of laser light 363 impinges on hologram film 310 at an incident angle outside the angular bandwidth of hologram film 310.

Subsequent to physically coupling donor film 320 to hologram film 310, donor material may diffuse from donor film 320 into hologram film 310 causing at least a portion of hologram film 310 to swell and increasing the bandwidth of hologram film 310. Diffusion of donor material from donor film 320 into hologram film 310 occurs at the interface between donor film 320 and hologram film 310, i.e., the surface of hologram film 310 to which donor film 320 is physically coupled. After diffusing into hologram film 310 at the interface, donor material may further diffuse through the depth of hologram film 310. The influx of donor material into hologram film 310 at the interface causes the concentration of donor material to be highest in the portion of hologram film 310 that is nearest the interface; in other words the greatest amount of donor material will be located nearest the interface. The concentration of donor material will decrease as a function of depth, with the lowest concentration of donor material located at a depth furthest away from the interface. The continuous change in concentration of donor material as a function of depth causes a continuous change in Bragg angle as a function of depth, thereby causing an increase in bandwidth of hologram 310.

The increase in bandwidth of hologram film 310 may allow hologram film 310 to diffract second beam of laser light 362 to produce second diffracted light signal 372 with a second playback angle; in other words, the increase in bandwidth of hologram film 310 due to the diffusion of donor material may allow hologram film 310 to play back second beam of laser light 362 and produce diffracted light signal 372. Diffracted light signal 372 possesses a second playback angle. Second light sensor 342 is positioned and oriented such that diffracted light signal 372 impinges upon second light sensor 342; in other words second light sensor 372 is positioned at a second playback angle relative to hologram film 310. The intensity of second diffracted light signal 372 may be measured by second light sensor 342.

The increase in bandwidth of hologram film 310 may allow hologram film 310 to diffract third beam of laser light 363 to produce third diffracted light signal 373 with a third playback angle; in other words, the increase in bandwidth of hologram film 310 due to the diffusion of donor material may allow hologram film 310 to play back third beam of laser light 363 and produce diffracted light signal 373. Diffracted light signal 373 possesses a third playback angle. Third light sensor 343 is positioned and oriented such that diffracted light signal 373 impinges upon third light sensor 343; in other words third light sensor 373 is positioned at a third playback angle relative to hologram film 310. The intensity of third diffracted light signal 373 may be detected by third light sensor 343.

The extent of bandwidth broadening within hologram film 310 may be monitored by comparing the intensity of first diffracted light signal 371 to the intensity of second diffracted light signal 372 and third diffracted light signal 373. Immediately after donor film 320 is physically coupled to hologram film 310, and prior to any significant amount of diffusion of donor material into hologram film 310, first diffracted light signal 371 will be at a maximum intensity while second diffracted light signal 372 and third diffracted light signal 373 will be at a minimum. As donor material diffuses into hologram film 310 and increases the bandwidth of hologram film 310, hologram film 310 will more efficiently diffract second beam of laser light 362 and third beam of laser light 363 and the intensity of second diffracted light signal 372 and third diffracted light signal 373 will increase.

The amount of bandwidth broadening necessary to cause an observable increase in the intensity of second diffracted light signal 372 and third diffracted light signal 373 depends on the second incident angle and the third incident angle, respectively. In at least one implementation, second laser light source 332 and third laser light source 333 may be positioned and oriented such that the second incident angle is intermediate between the first incident angle and third incident angle. As the bandwidth of hologram film 310 increases, the intensity of second diffracted light signal 372 will increase prior to any increase in the intensity of third diffracted light signal 373.

Once the desired level of bandwidth broadening has occurred, determined by monitoring the bandwidth of hologram film 310 via comparing the intensity of first diffracted light signal 371 to the intensity of second diffracted light signal 372 and third diffracted light signal 373, the diffusion of donor material into hologram film 310 and thereby the process of bandwidth broadening may be halted by the activation of curing lamp 350. Upon activation, curing lamp 350 produces light of a wavelength or range of wavelengths that fixes the donor material; fixing the donor material may include curing the donor material. Non-exclusive examples of wavelengths of light that may fix donor material include deep UV, UVA, UVB, and visible light. Activating curing lamp 350 fixes the donor material within hologram film 310; activating curing lamp 350 may also fix the donor material within donor film 320. Curing the donor material may include converting the donor material from a non-solid state (e.g., liquid, gel, etc.) to a solid state. The light produced by curing lamp 350 may bleach the donor material. Bleaching the donor material includes converting the donor material from a photosensitive material into a material that is insensitive to light.

If a relatively small amount of bandwidth broadening is desired, curing lamp 350 may be activated immediately upon an observed increase in the intensity of diffracted light signal 372 as detected by second light sensor 342. If a relatively large amount of bandwidth broadening is desired, the activation of curing lamp 350 may be delayed until after an increase in the intensity of third diffracted light signal 373 is detected by third light sensor 343. Greater variety in available levels of bandwidth broadening may be obtained through the inclusion of additional laser light sources and light sensors in hologram controllable bandwidth broadening apparatus 300. At least one laser light source may be moveable; in other words a given laser light source may be positioned at a variety of illumination angles. At least one laser light source may include an optical element which directs light towards hologram 310 from two or more effective positions, where each effective position includes a respective illumination angle. At least one laser light sources emit laser light wherein the laser light sweeps across a range of angles, where the range of angles swept by the laser light includes a range of illumination angles swept by the laser light.

Subsequent to the activation of curing lamp 350, donor film 320 may be physically de-coupled from hologram film 310, where hologram film 310 now comprises a hologram with controllably broadened bandwidth. Curing the donor material causes the donor material to harden. Fixing the donor material chemically links the donor material to hologram film 310. Each of curing and fixing the swelling reduces the ability of the donor material to diffuse. Curing and fixing the donor material ensures that the swelling of hologram fringes is maintained at the desired level.

Each of: first laser light source 331, second laser light source 332, and third laser light source 333, may produce laser light with the same wavelength. Each of: first laser light source 331, second laser light source 332, and third laser light source 333, may produce laser light by splitting a beam of laser light provided by an additional laser light source into multiple sub-beams of laser light, where Each of: first laser light source 331, second laser light source 332, and third laser light source 333, emits a respective sub-beam of laser light. Each of: first laser light source 331, second laser light source 332, and third laser light source 333, may comprise a multiple-wavelength laser light source, where Each of: first laser light source 331, second laser light source 332, and third laser light source 333, emits N beams of laser light and each of the N beams of laser light is of a different wavelength than each of the other N beams of laser light. The N beams of laser light may have a wavelength that falls within the wavelength bandwidth of hologram film 310 prior to controllable bandwidth broadening, which is advantageous because small changes in wavelength may cause large changes in the angle of the resulting diffracted light signals, allowing more accurate determination of the extent of bandwidth broadening. The N beams of laser light may have a wavelength that falls within the wavelength bandwidth of hologram film 310 subsequent to controllable bandwidth broadening, which is advantageous as this allows the wavelength bandwidth of hologram film 310 to be monitored. The N beams of laser light may comprise a red beam of laser light, a green beam of laser light, and a blue beam of laser light, which is advantageous as this allows the bandwidth of each wavelength-specific hologram comprising a wavelength-multiplexed hologram to be monitored independently. Each of: first laser light source 331, second laser light source 332, and third laser light source 333, may be a continuous wave laser, a pulsed laser, a diode laser, or a similar type of laser light source.

The wavelength of laser light produced Each of: first laser light source 331, second laser light source 332, and third laser light source 333, may be of a wavelength that is not absorbed by the donor material within donor film 320. The wavelength of laser light produced by Each of: first laser light source 331, second laser light source 332, and third laser light source 333, may be of the same wavelength as one of the light sources used to record the hologram.

Each light sensor may comprise a single-wavelength light sensor, where a single-wavelength light sensor comprises a sensor that is sensitive to a limited sensitive wavelength range, where the limited sensitive wavelength range may be less than 2 nm, less than 0.5 nm, or less than 0.1 nm. A single-wavelength light sensor may comprise a wavelength-agnostic light sensitive element and a wavelength selector. A non-exclusive example of a wavelength-agnostic light sensitive element is a photomultiplier tube. Non-exclusive examples of wavelength selectors include: a bandpass filter, an interference filter, a hologram, and a prism. A single-wavelength light sensor may comprise one or more wavelength-specific light sensitive elements. Non-exclusive examples of wavelength-specific light sensitive elements include photodiodes, CCD camera sensors.

Filters may, for example, take the form of a specific filter that only allows light within a limited sensitive wavelength range to pass through it.

A single-wavelength light sensor may comprise a hologram with a wavelength bandwidth equal to the limited sensitive wavelength range. Single-wavelength light sensors are advantageous as they allow the intensity of diffracted light signals with similar wavelengths to be differentiated.

Controllable bandwidth broadening apparatus 300 may comprise a cylindrical roller compatible with roll-to-roll printing methods, wherein roll-to-roll printing methods include roll-to-roll hologram recording. The rate of diffusion of donor material typically increases with increasing temperature and decreases with decreasing temperature, therefore control of the temperature of the hologram film and the donor film increases control over the process of bandwidth broadening within controllable bandwidth broadening apparatus 300. Controllable bandwidth broadening apparatus 300 may comprise a heat source to increase the temperature of hologram film 310 and donor film 320. Non-exclusive examples of heat sources include: an electric heating element, an inductive heater, and a radiative heater. Controllable bandwidth broadening apparatus 300 may comprise a cold source to decrease the temperature of hologram film 310 and donor film 320. Non-exclusive examples of cold sources include: a heat pump, a compressed gas outlet nozzle, a chilled gas outlet nozzle, and a liquid nitrogen sprayer. Controllable bandwidth broadening apparatus 300 may comprise a temperature sensor to monitor the temperature at least one of: hologram film 310 and, or, donor film 320.

In an alternative implementation, a hologram controllable bandwidth broadening apparatus may comprise an apparatus substantively similar to hologram controllable bandwidth broadening apparatus 300 with only a single laser light source and only a single light sensor. In the alternative implementation the light sensor is positioned and oriented at a single incident angle that is outside the angular bandwidth of the hologram, and the light sensor is positioned and oriented to determine the intensity of the laser light diffracted by the hologram at a single playback angle once the bandwidth of the hologram has been increased. Bandwidth broadening may be monitored and controlled in a manner substantively similar to hologram controllable bandwidth broadening apparatus 300. The alternative implementation is advantageous as it requires fewer parts to operate effectively, however the single available incident angle and single available playback angle may limit the accuracy and reliability of the bandwidth broadening performed by the alternative implementation.

Figure 4:
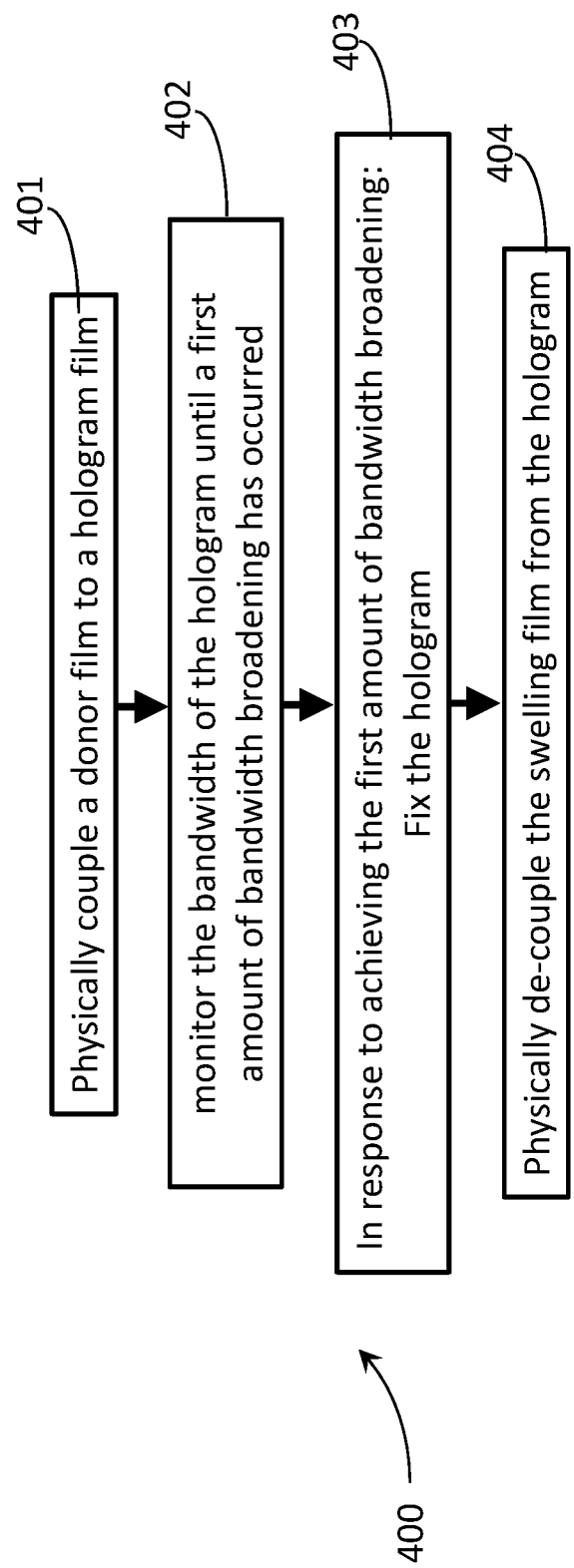
FIG. 4 is a flow-diagram showing a method of controllable broadening of the bandwidth of a hologram in accordance with the present systems, devices, and methods.

FIG. 4 is a flow-diagram showing a method 400 of controllable broadening of the bandwidth of a hologram in accordance with the present systems, devices, and methods. The hologram produced via method 400 may be substantially similar to controllably bandwidth-broadened hologram 200 and generally includes broadening the bandwidth of a hologram in a controllable manner. Method 400 includes four acts 401, 402, 403, and 404, though those of skill in the art will appreciate that in alternative implementations or embodiments certain acts may be omitted and/or additional acts may be added. Those of skill in the art will also appreciate that the illustrated order of the acts is shown for exemplary purposes only and may change in alternative embodiments. Method 400 may include employing hologram controllable bandwidth broadening apparatus 300.

At 401, a donor film is physically coupled to a hologram film. The donor film may be physically coupled to the hologram by pressing the donor film and the hologram together. The donor film may be physically coupled to the hologram with an adhesive (e.g., pressure-sensitive adhesive, optically clear adhesive, low-temperature optically clear adhesive); alternatively the donor film may possess sufficient adhesive properties (e.g., tackiness) that an additional adhesive is not required to ensure physical coupling between the donor film and the hologram. The donor film may comprise donor material and an inert matrix. The donor material may comprise photosensitive material, where photosensitive material may comprise: at least one sensitizer dye, at least one monomer, counter-diffusant, urethane oligomer, photo-initiator and co-initator. Non-exclusive examples of monomer include methyl methacrylate, ethylene glycol dimethacrylate and trimethylpropane triacrylate. Photosensitive material may be similar to material comprising the HRM in which the hologram was recorded. The donor material may advantageously comprise material that is insensitive to the wavelength(s) of light used to monitor bandwidth broadening.

Physically coupling the donor film to the hologram film causes donor material to diffuse from the donor film into the hologram. The concentration of donor material within the donor film is initially higher than the concentration of donor material within the hologram, therefore the chemical potential of the donor material is higher in the donor film relative to the hologram. Once the donor film is physically coupled to the hologram, the higher chemical potential of the donor material within the donor film causes the donor material to diffuse from the donor film into the hologram. The movement of donor material into the hologram film may be actively driven, for example through the application of an electric field (for donor material comprising electrically charged donor material) where the applied electric field causes electrically charged donor material to move; movement of donor material may similarly be actively driven through the application of a magnetic field (for donor material comprising magnetically active donor material).

The donor material must cross the interface between the donor film and the hologram, thus donor material must enter the hologram at the donor film/hologram interface. The concentration of donor material, and therefore the chemical potential of the donor material, within the hologram will be highest at a depth nearest to the donor film/hologram interface and will decrease as the distance from the donor film/hologram interface increases, i.e., as the depth increases in a direction away from the film/hologram interface. The donor material will then diffuse from the donor film/hologram interface towards the opposite side of the hologram.

Diffusion of donor material from the donor film into the hologram requires some amount of time, with a greater amount of time allowing a greater amount of diffusion from the donor film into the hologram. Given sufficient time, the chemical potential (and therefore the concentration) of donor material within the hologram will become equal to the chemical potential of donor material within the donor film and diffusion will cease. Diffusing donor material from the donor film/hologram interface towards the opposite side of the hologram requires some amount of time, with a greater amount of time allowing a greater amount of diffusion from the donor film/hologram interface towards the opposite side of the hologram. Given sufficient time, the chemical potential (and therefore the concentration) of donor material at the donor film/hologram interface will become equal to the chemical potential of donor material at the opposite side of the hologram and diffusion will cease. If diffusion of donor material is halted prior to equalization of the concentration of donor material within the hologram film, a concentration gradient of donor material will both exist and persist within the hologram film.

If the donor material comprises electrically charged donor material, application of an electric field to the hologram film may create a concentration gradient within the hologram film as electrically charged donor material moves in response to the applied electric field. If the donor material comprises magnetically active donor material, application of a magnetic field to the hologram film may create a concentration gradient within the hologram film as magnetically active donor material moves in response to the applied magnetic field.

The presence of donor material within the hologram causes the fringes within the hologram to swell and/or the slant angle of the hologram fringes to change, and fringes that are swollen and/or have their slant angle changed play back at different angles than un-swollen fringes. When the concentration of donor material at the donor film/hologram interface is higher than the concentration of donor material on the opposite side of the hologram the fringes at the donor film/hologram interface, the fringes at the donor film/hologram interface will play back at different angles than the fringes on the opposite side of the hologram; the angular bandwidth of the hologram is thereby broadened (an increase in angular bandwidth also causes an increase in spectral bandwidth). The difference in the amount of swelling and/or the extent of the change in slant angle of the fringes at the donor film/hologram interface versus the opposite side of the hologram determines the amount of bandwidth broadening, which in turn depends on the amount of donor material that diffuses from the donor film into the hologram and the gradient of donor material within the hologram.

At 402, the bandwidth of the hologram is monitored. Monitoring the bandwidth of the hologram may include measuring the spectral bandwidth of the hologram and measuring the angular bandwidth of the hologram. Monitoring the bandwidth of the hologram may include measuring the bandwidth of the hologram continuously or at discrete moments in time.

Monitoring the bandwidth of the hologram may include illuminating the hologram with at least one beam of laser light with at least one incident angle, which allows the angular bandwidth of the hologram to be monitored if at least one of the incident angles is not within the initial angular bandwidth of the hologram film. Monitoring the bandwidth of the hologram may include monitoring the intensity of laser light that is diffracted by the hologram at at least one playback angle when the hologram is illuminated by laser light with at least one incident angle. The accuracy and reliability of monitoring the bandwidth of the hologram may be increased by increasing the number of incident angles of laser light illuminating the hologram and, correspondingly, increasing the number of angles at which the intensity of diffracted light is measured. Monitoring the bandwidth of the hologram may include monitoring the intensity of laser light that is diffracted by the hologram at at least one angle.

Monitoring the bandwidth of the hologram may include illuminating the hologram with at least one beam of laser light with at least one wavelength, which allows the wavelength bandwidth of the hologram to be monitored if at least one of the wavelengths is not within the initial angular bandwidth of the hologram film. Monitoring the bandwidth of the hologram may include monitoring the intensity of laser light that is diffracted by the hologram at at least one playback angle when the hologram is illuminated by laser light with at least one wavelength, since the playback angle of a hologram depends strongly on the wavelength of laser light illuminating the hologram. Monitoring the bandwidth of the hologram may include monitoring the intensity of laser light that is diffracted by the hologram at at least one playback wavelength when the hologram is illuminated by laser light with at least one wavelength, since the hologram may only diffract light that is within the wavelength bandwidth of the hologram. Illuminating the hologram with laser light may include illuminating the hologram with laser light where the laser light comprises light of a wavelength which may not be absorbed by the donor material.

The hologram film may comprise at least one plane-wave sub-hologram. A plane-wave sub-hologram is a hologram recorded into the hologram film, where the light used to record the plane-wave sub-hologram comprised collimated (i.e., plane-wave) light. The plane wave sub-hologram may advantageously be located in a portion of the hologram film that is outside the area of the hologram film containing a recorded HOE; in other words the hologram film comprises a primary hologram and at least one plane-wave sub-holograms. The primary hologram is the hologram intended for use in, for example, a transparent holographic combiner. The plane-wave sub-hologram may advantageously be removed from the hologram film after controllable bandwidth broadening, for example by cutting, grinding, or otherwise removing the portion of the hologram film containing the at least one plane-wave sub-hologram. Plane wave holograms are advantageous as they do not require careful alignment in order to accurately monitor their bandwidth during controllable bandwidth broadening. The primary hologram within the hologram film may comprise a spherical-wave hologram, which is advantageous as it allows the hologram to focus (or defocus) laser light to (or away from) a focal point. However, in order to accurately monitor the bandwidth of a spherical-wave hologram during controllable bandwidth broadening, the exact center point of the spherical-wave hologram must be illuminated by the beam of laser light. If the exact center of the spherical-wave hologram is not illuminated, the playback wavelength of the spherical-wave hologram will depend on the distance between the illuminated spot and the center of the spherical-wave hologram. Careful alignment of the hologram is difficult and time-consuming, and therefore expensive. The controllable bandwidth broadening of the plane-wave sub-hologram may be employed to report on the controllable bandwidth broadening of the primary hologram; in other words the bandwidth broadening of the primary hologram may be monitored by monitoring the bandwidth broadening of the plane-wave sub-hologram. The use of more than one plane-wave sub-hologram, and the monitoring of their bandwidth broadening, allows the uniformity of bandwidth broadening to be determined across the area of the hologram film.

As the donor material diffuses from the donor film into the hologram the bandwidth of the hologram will increase. Monitoring the bandwidth of the hologram allows the effect of diffusing donor material from the donor film into the hologram to be measured. After the passage of some amount of time, a first amount of bandwidth broadening will have been achieved.

At 403, in response to achieving the first amount of bandwidth broadening, the hologram is fixed. Fixing the hologram may include bleaching and curing the donor material. Bleaching the donor material causes the donor material to become transparent. Curing the donor material hardens the donor material and stops diffusion of the donor material. Diffusion of the donor material is considered to have stopped when the rate of diffusion of donor material at room temperature is less than 0.1% of the rate of diffusion of donor material prior to curing. Curing the donor material may include photopolymerizing the donor material; photopolymerizing the donor material increases the molecular weight of the donor material and thereby approximately stops diffusion of the donor material. Photopolymerizing the donor material may include exposing the donor material to visible light and exposing the donor material to UV light.

Fixing the hologram stops diffusion of donor material and thereby ensures that, once the desired degree of bandwidth broadening has been achieved, no further bandwidth broadening occurs.

At 404, the donor film is physically de-coupled from the hologram.

The hologram film may comprise a wavelength-multiplexed hologram film, wherein a wavelength-multiplexed hologram film comprises at least two wavelength-specific holograms. Each wavelength specific hologram film has a respective wavelength bandwidth and center wavelength. Each wavelength-specific hologram is therefore responsive to a respective range of wavelengths. The bandwidth of each wavelength-specific hologram film may be monitored independently. Monitoring the bandwidth of the hologram within the hologram film until a first amount of bandwidth broadening has occurred may include monitoring the bandwidth of each wavelength-specific hologram comprising the hologram film until a respective first amount of bandwidth broadening has occurred for each wavelength specific hologram comprising the hologram film. A person of skill in the art will appreciate that the wavelength bandwidth of a hologram may be expressed in units of distance (e.g., nm) or in units of energy (e.g., $cm^{-1}$), and that values expressed in units of distance vary inversely with values expressed in energy. The first amount of bandwidth broadening for each wavelength-specific hologram may comprise a set of amounts of bandwidth broadening, with the set of amounts of bandwidth broadening comprising a respective amount of bandwidth broadening for each wavelength-specific hologram.

Method 400 may further comprise recording a hologram in a holographic recording medium (HRM) to form a holographic optical element (HOE), where a HRM is a hologram film. Recording a hologram in a HRM may include recording a wavelength-multiplexed hologram. Recording a wavelength-multiplexed hologram may include recording a red hologram, a green hologram, and a blue hologram. Recording a hologram in a HRM may include recording an angle-multiplexed hologram.

Recording a hologram in a HRM may include mounting the HRM on a recording substrate; illuminating the HRM with laser light; dis-mounting the HRM from the recording substrate; and pre-fixing the HRM to produce a hologram. A recording substrate comprises an inflexible transparent material that defines the shape of the HRM during recording. Typical recording substrates may be flat and planar. Typical recording substrate materials include glass and polycarbonate. Pre-fixing the HRM renders the HRM insensitive to light; further hologram recording is not possible in a pre-fixed HRM. Illuminating the HRM with laser light may include illuminating the HRM with at least one object laser beam and illuminating the HRM with at least one reference laser beam.

The hologram film may comprise a first photopolymer film, the donor film may comprise a second photopolymer film, and physically coupling the donor film to the hologram film may include physically coupling the first hologram film to the second hologram film. The hologram film comprising a first photopolymer is advantageous as the process of recording a hologram in a photopolymer film is well-established in the holography industry. The donor film comprising a photopolymer film is advantageous as the donor material comprises the same material initially used to record the hologram in the hologram film, which ensures compatibility between the donor material and the hologram film.

Method 400 may further comprise bleaching the hologram film. Method 400 may further comprise physically coupling an additional donor film to the hologram film, monitoring the bandwidth of the hologram within the hologram film until a second amount of bandwidth broadening has occurred, in response to achieving the second amount of bandwidth broadening: fixing the hologram film, and physically de-coupling the additional donor film from the hologram film. The process of controllable bandwidth broadening may be performed in sequence, where each round of controllable bandwidth broadening further broadens the bandwidth of a previously controllably-bandwidth broadened hologram film. Each round of controllable bandwidth broadening further modifies the bandwidth of the hologram film, which may include an overall increase in the bandwidth, a change in the shape of the bandwidth profile, or a change in the center wavelength/angle of the bandwidth of the hologram film.

The rate of diffusion of donor material typically increases with increasing temperature and decreases with decreasing temperature, therefore control of the temperature of the hologram film and the donor film increases control over the process of bandwidth broadening. Method 400 may further comprise heating at least one of: the hologram film and the donor film to increase the temperature of at least one of: the hologram film and the donor film. Heating at least one of: the hologram film and the donor film may be achieved with a heat source. Non-exclusive examples of heat sources include: an electric heating element, an inductive heater, and a radiative heater. Method 400 may further comprise cooling at least one of: the hologram film and the donor film to decrease the temperature of at least one of: the hologram film and the donor film. Cooling at least one of: the hologram film and the donor film may be achieved with a cold source. Non-exclusive examples of cold sources include: a heat pump, a compressed gas outlet nozzle, a chilled gas outlet nozzle, and a liquid nitrogen sprayer. Method 400 may further comprise monitoring the temperature at least one of: the hologram film and the donor film.

The combination of causing diffusion of donor material into the hologram, measuring the effect of that diffusion of donor material by monitoring the bandwidth of the hologram, and then halting the diffusion of donor material by fixing the hologram in accordance with the present systems, designs, and methods, allows the diffusion of donor material into the hologram to be controllable. Since bandwidth broadening depends directly on the diffusion of donor material, the present systems, designs, and methods allow for bandwidth broadening to be controllable.

Figure 5:
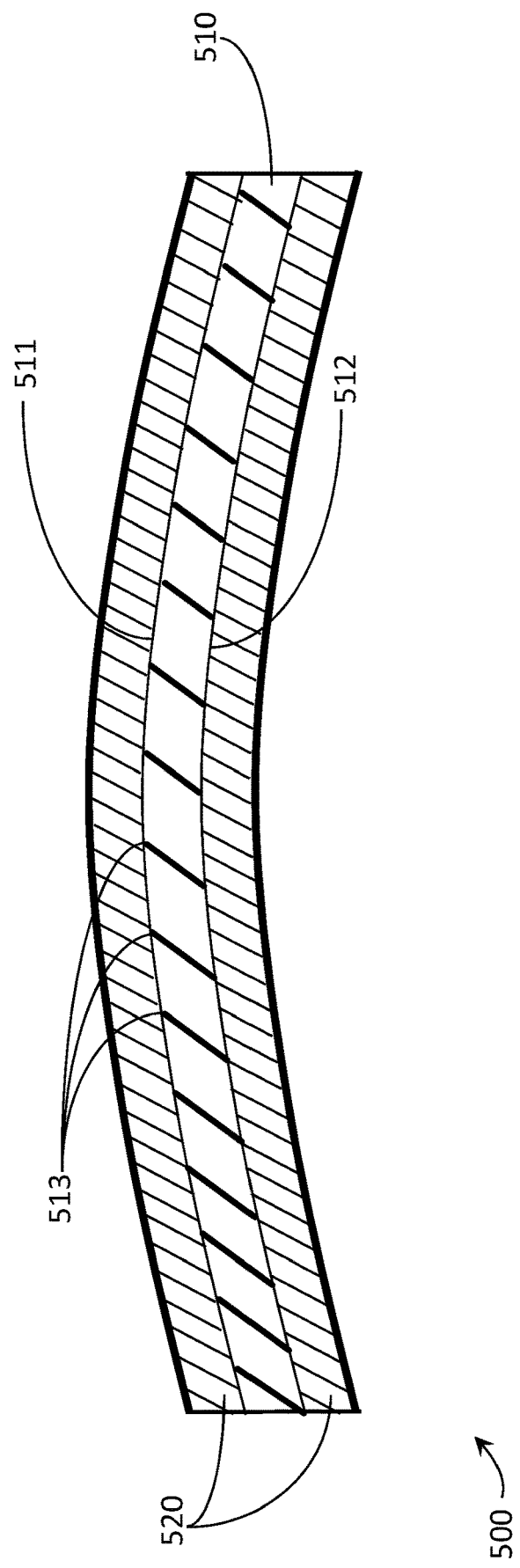
FIG. 5 is a cross-sectional view of an exemplary eyeglass lens with an embedded hologram with controllably broadened bandwidth suitable for use as a transparent combiner in a WHUD in accordance with the present systems, devices, and methods.
Figure 7:
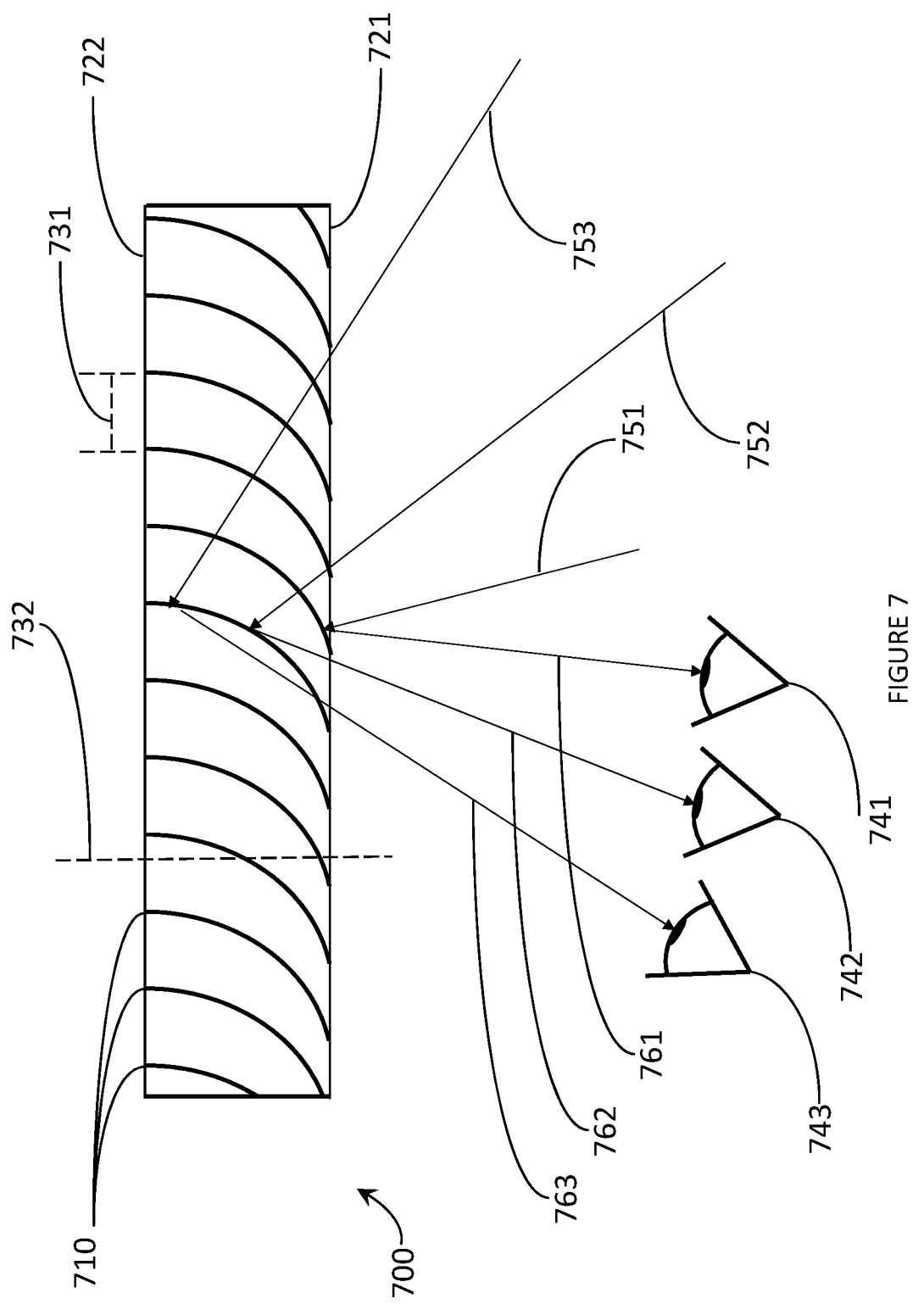
FIG. 7 is a cross-sectional view of controllably bandwidth-broadened hologram in accordance with the present systems, devices, and methods, and illustrating a number of exemplary exit pupils associated therewith.

FIG. 5 is a cross-sectional view of an exemplary eyeglass lens 500 with an embedded controllably bandwidth-broadened hologram 510 suitable for use as a transparent combiner in a WHUD in accordance with the present systems, devices, and methods. Eyeglass lens 500 with an embedded controllably bandwidth-broadened hologram 510 comprises controllably bandwidth-broadened hologram 510 and lens assembly 520. Controllably bandwidth-broadened hologram 510 may be substantively similar to controllably bandwidth-broadened hologram 200. Controllably bandwidth-broadened hologram 510 may be substantively similar to controllably bandwidth-broadened hologram 700 (FIG. 7). Controllably bandwidth-broadened hologram 510 is embedded within an internal volume of lens assembly 520. Controllably bandwidth-broadened hologram 510 may be physically coupled to lens assembly 520 with a low-temperature optically clear adhesive (LT-OCA).

Controllably bandwidth-broadened hologram 510 comprises first surface 511, second surface 512, and set of fringes 513. Due to the controllable bandwidth broadening that was previously applied to controllably bandwidth-broadened hologram 510, the slant angle of set of fringes 513 varies continuously as a function of depth within controllably bandwidth-broadened hologram 510. Depth may be defined as a distance between first surface 511 and second surface 512 within controllably bandwidth-broadened hologram 510. The continuous change in slant angle of set of fringes 513 as a function of depth causes the Bragg angle of set of fringes 513 to vary as a function of depth. The continuous change in slant angle of set of fringes 513 as a function of depth causes the Bragg angle of set of fringes 513 to vary as a function of depth. In other words, set fringes 513 possesses a first Bragg angle nearest first surface 511, set fringes 513 possess a second Bragg angle nearest second surface 512, and the Bragg angle of set of fringes 513 varies between first surface 511 and second surface 512.

Where controllably bandwidth-broadened hologram 510 comprises a reflection hologram, controllably bandwidth-broadened hologram 510 may possess an angular bandwidth of 18.5 degrees, 38 degrees, or 63 degrees, where a substantively similar hologram may possess an wavelength bandwidth of 17 degrees prior to controlled bandwidth broadening, and where a greater angular bandwidth provides a wider range of available effective positions for a projector when eyeglass lens 500 is employed as a transparent combiner in a WHUD.

The slant angle of set of fringes 513 varies as a function of depth due to the varying concentration of donor material as a function of depth within controllably bandwidth-broadened hologram 510; in other words set of hologram fringes 513 comprises a first concentration of donor material nearest first surface 511 and the hologram fringes nearest second surface 512 comprises a second concentration of donor material. The variation of donor material as a function of depth within controllably bandwidth-broadened hologram 510 may comprise a continuous increase in donor material concentration from first surface 511 to second surface 512, a continuous decrease in donor material concentration from first surface 511 to second surface 512, or variation including increases and decreases in donor material concentration at varying depths within controllably bandwidth-broadened hologram 510. The varying concentration of donor material as a function of depth within controllably bandwidth-broadened hologram 510 may cause the fringe spacing of set of fringes 513 to vary as a function of depth.

Controllably bandwidth-broadened hologram 510 may comprise fixed photopolymer material. The concentration of donor material at first surface 511 may be less than, or in the alternative greater than, the concentration of fixed photopolymer at first surface 511. The concentration of donor material at second surface 512 may be less than, or in the alternative greater than, the concentration of fixed photopolymer at second surface 512. The variation in concentration of donor material within controllably bandwidth-broadened hologram 510 may cause the concentration of fixed photopolymer material within controllably bandwidth-broadened hologram 510 to vary.

Controllably bandwidth-broadened hologram 510 may comprise a wavelength-multiplexed hologram, where a wavelength-multiplexed hologram may be advantageous when eyeglass lens 500 is employed as a transparent holographic combiner in a full-color WHUD.

The broad angular bandwidth of controllably bandwidth broadened hologram 510 allows a wide range of incident angles and therefore a broad spatial distribution of exit pupils for a WHUD utilizing eyeglass lens 500 as a holographic combiner. The wavelength-multiplexed hologram may comprise a red hologram, a green hologram, and a blue hologram. The wavelength-multiplexed hologram may further comprise an infrared hologram. An infrared hologram may be employed as a part of an eye-tracking system comprising a WHUD.

Figure 6:
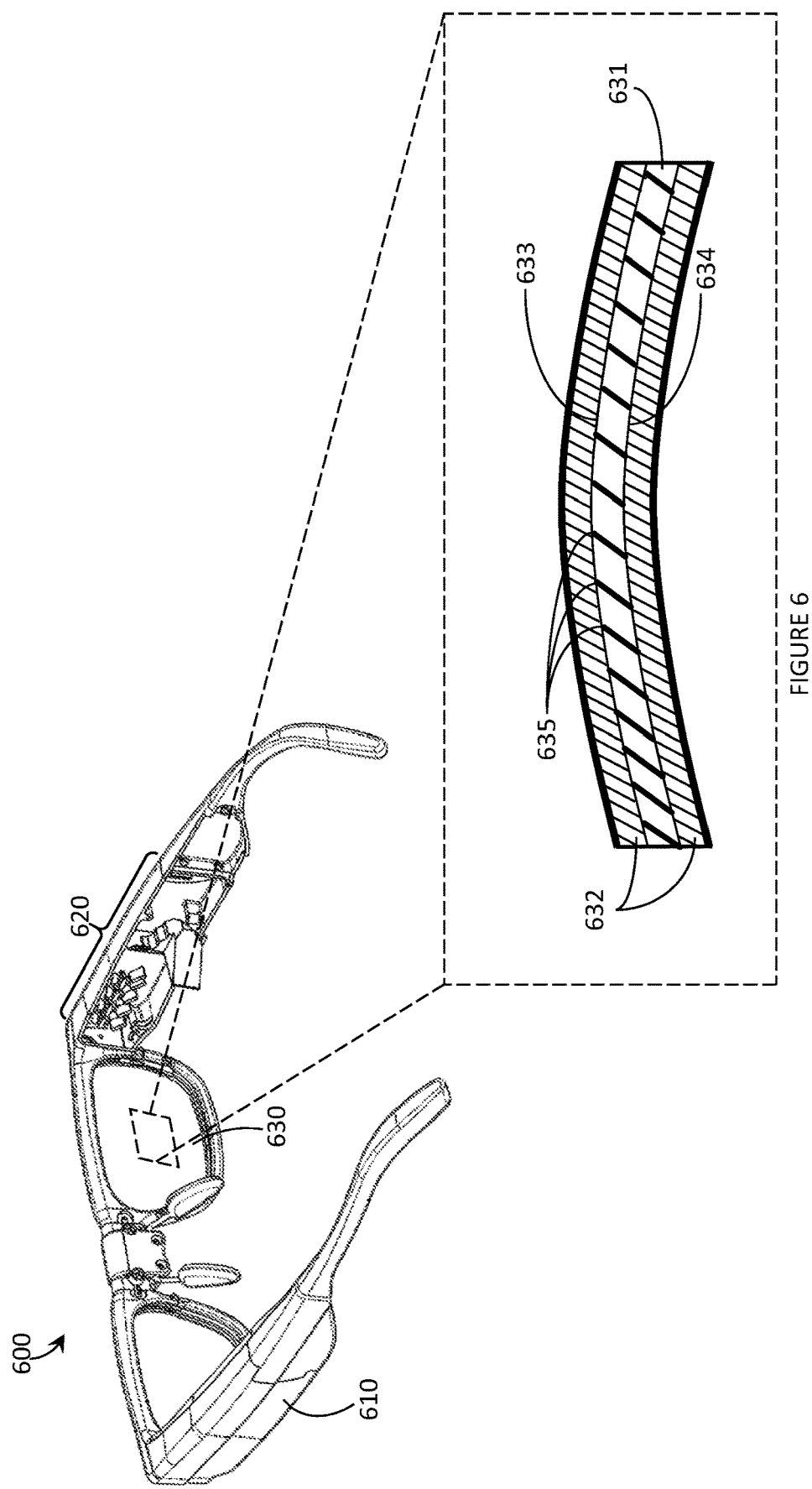
FIG. 6 is a partial-cutaway perspective view of a WHUD that includes an eyeglass lens with an embedded hologram with controllably broadened bandwidth in accordance with the present systems, devices, and methods.

FIG. 6 is a partial-cutaway perspective view of a WHUD 600 that includes an eyeglass lens 630 with an embedded controllably bandwidth-broadened hologram 631 in accordance with the present systems, devices, and methods. Eyeglass lens 630 comprises controllably bandwidth-broadened hologram 631 and lens assembly 632. Controllably bandwidth-broadened hologram 631 is embedded within an internal volume of lens assembly 632. Controllably bandwidth-broadened hologram 631 may be physically coupled to lens assembly 632 with a low-temperature optically clear adhesive (LT-OCA).

Eyeglass lens 630 may be substantially similar to eyeglass lens 500 from FIG. 5. Controllably bandwidth-broadened hologram 631 may be substantively similar to controllably bandwidth-broadened hologram 200. Controllably bandwidth-broadened hologram 631 may be substantively similar to controllably bandwidth-broadened hologram 700. WHUD 600 comprises a support structure 610 that is worn on the head of the user and has a general shape and appearance of an eyeglasses (e.g., sunglasses) frame. Support structure 610 carries multiple components, including: an image source 620, and an eyeglass lens 630. Image source 620 is positioned and oriented to direct light towards the eyeglass lens and may include, for example, a micro-display system, a scanning laser projection system, or another system for generating display images. FIG. 6 provides a partial-cutaway view in which regions of support structure 610 have been removed in order to render visible portions of image source 620 and clarify the location of image source 620 within WHUD 600. Eyeglass lens 630 is positioned within a field of view of an eye of the user when the support structure is worn on the head of the user and serves as both a conventional eyeglass lens (i.e., prescription or non-prescription depending on the needs of the user) and a transparent combiner. WHUD 600 may possess an expanded eyebox relative to a WHUD comprising a transparent combiner lacking a hologram with controllably broadened bandwidth.

Controllably bandwidth-broadened hologram 631 comprises first surface 633, second surface 634, and set of fringes 635. Due to the controllable bandwidth broadening that was previously applied to controllably bandwidth-broadened hologram 631, the slant angle of set of fringes 635 varies continuously as a function of depth within controllably bandwidth-broadened hologram 631. Depth may be defined as a distance between first surface 633 and second surface 634 within controllably bandwidth-broadened hologram 631. The continuous change in slant angle of set of fringes 635 as a function of depth causes the Bragg angle of set of fringes 635 to vary as a function of depth. The continuous change in slant angle of set of fringes 635 as a function of depth causes the Bragg angle of set of fringes 635 to vary as a function of depth. In other words, set fringes 635 possesses a first Bragg angle nearest first surface 633, set fringes 635 possess a second Bragg angle nearest second surface 634, and the Bragg angle of set of fringes 635 varies between first surface 633 and second surface 634.

Where controllably bandwidth-broadened hologram 631 comprises a reflection hologram, controllably bandwidth-broadened hologram 631 may possess an angular bandwidth of 18.5 degrees, 38 degrees, or 63 degrees, where a substantively similar hologram may possess an wavelength bandwidth of 17 degrees prior to controlled bandwidth broadening, and where a greater angular bandwidth provides a wider range of available effective positions for image source 620 within WHUD 600.

The slant angle of set of fringes 635 varies as a function of depth due to the varying concentration of donor material as a function of depth within controllably bandwidth-broadened hologram 631; in other words set of hologram fringes 635 comprises a first concentration of donor material nearest first surface 633 and the hologram fringes nearest second surface 634 comprises a second concentration of donor material. The variation of donor material as a function of depth within controllably bandwidth-broadened hologram 631 may comprise a continuous increase in donor material concentration from first surface 633 to second surface 634, a continuous decrease in donor material concentration from first surface 633 to second surface 634, or variation including increases and decreases in donor material concentration at varying depths within controllably bandwidth-broadened hologram 631. The varying concentration of donor material as a function of depth within controllably bandwidth-broadened hologram 631 may cause the fringe spacing of set of fringes 635 to vary as a function of depth.

Controllably bandwidth-broadened hologram 631 may comprise fixed photopolymer material. The concentration of donor material at first surface 633 may be less than, or in the alternative greater than, the concentration of fixed photopolymer at first surface 633. The concentration of donor material at second surface 634 may be less than, or in the alternative greater than, the concentration of fixed photopolymer at second surface 634. The variation in concentration of donor material within controllably bandwidth-broadened hologram 631 may cause the concentration of fixed photopolymer material within controllably bandwidth-broadened hologram 631 to vary.

Controllably bandwidth-broadened hologram 631 may comprise a wavelength-multiplexed hologram, where a wavelength-multiplexed hologram allows WHUD 600 to be a full-color WHUD.

The broad angular bandwidth of controllably bandwidth broadened hologram 631 allows a wide range of incident angles and therefore a broad spatial distribution of exit pupils for image source 620 within WHUD 600. The wavelength-multiplexed hologram may comprise a red hologram, a green hologram, and a blue hologram. The wavelength-multiplexed hologram may further comprise an infrared hologram. An infrared hologram may be employed as a part of an eye-tracking system comprising WHUD 600.

FIG. 7 is a cross-sectional view of controllably bandwidth-broadened hologram 700 in accordance with the present systems, devices, and methods. Controllably bandwidth-broadened hologram 700 comprises set of fringes 710, first surface 721 and second surface 722. Due to the controllable bandwidth broadening that was previously applied to controllably bandwidth-broadened hologram 700, the slant angle of set of fringes 710 varies continuously as a function of depth within controllably bandwidth-broadened hologram 700. Depth may be defined as a distance between first surface 721 and second surface 722 within controllably bandwidth-broadened hologram 700. The continuous change in slant angle of set of fringes 710 as a function of depth causes the Bragg angle of set of fringes 710 to vary as a function of depth.

The incident angle of laser light that illuminates controllably bandwidth-broadened hologram 700 may be measured relative to normal 732. First beam of laser light 751 has a first incident angle that matches the Bragg condition for diffraction for set of hologram fringes only for the portion of set of hologram fringes 710 that is closest to first surface 721. In other words, controllably bandwidth-broadened hologram 700 has a first Bragg angle closest to first surface 721. Third beam of laser light 753 has a third incident angle that matches the Bragg condition for diffraction for set of hologram fringes only for the portion of set of hologram fringes 710 that are closer to second surface 722. In other words, controllably bandwidth-broadened hologram 700 has a second Bragg angle closest to second surface 722. Third beam of laser light 753 has an incident angle that does not match the Bragg condition for diffraction for set of hologram fringes 710 for the portion of set of hologram fringes 710 that is closest to first surface 721. Second beam of laser light 752 has an incident angle that only matches the Bragg condition for diffraction for the portion of set of hologram fringes 710 that is at a depth intermediate between first surface 721 and second surface 722.

The continuous variation of Bragg angle of set of fringes 710 as a function of depth causes set of fringes 710 to diffract light of varying incident angles as a function of depth. For a given portion of set of fringes 710 the angular bandwidth may be relatively narrow, however laser light may pass through the entire depth of controllably bandwidth-broadened hologram 700. So long as any portion of set of hologram fringes 710 (at any depth within controllably bandwidth-broadened hologram 700) has Bragg conditions for diffraction satisfied by a given beam of laser light, controllably bandwidth-broadened hologram 700 may diffract said beam of laser light. In this manner, the angular bandwidth of controllably bandwidth-broadened hologram 700 as a whole is broad, even though the angular bandwidth of any given portion of controllably bandwidth-broadened hologram 700 may be narrow. A person of skill in the art of holography will appreciate that the angular bandwidth of a transmission hologram is larger than the angular bandwidth of an equivalent reflection hologram, and that the angular bandwidth of a reflection hologram decreases with increasing thickness of the reflection hologram. A typical reflection hologram may possess an wavelength bandwidth of 17 degrees prior to controllable-bandwidth broadening; after controllable-bandwidth broadening said hologram may possess an angular bandwidth of 18.5 degrees, 38 degrees, or 63 degrees, where a greater angular bandwidth provides a wider range of available effective positions for a projector when controllably bandwidth-broadened hologram 700 is employed as a transparent combiner in a WHUD.

A beam of laser light may be diffracted by controllably bandwidth-broadened hologram 700 to produce a diffracted object beam, where the playback angle of the diffracted object beam depends on the incident angle of the beam of laser light. First beam of laser light 751 may be diffracted by controllably bandwidth-broadened hologram 700 to produce first diffracted object beam 761. First diffracted object beam 761 has a first playback angle and is directed towards first exit pupil 741. Second beam of laser light 752 may be diffracted by controllably bandwidth-broadened hologram 700 to produce second diffracted object beam 762. Second diffracted object beam 762 has a second playback angle and is directed towards second exit pupil 742. Third beam of laser light 753 may be diffracted by controllably bandwidth-broadened hologram 700 to produce third diffracted object beam 763. Third diffracted object beam 763 has a third playback angle and is directed towards third exit pupil 743.

The slant angle of set of fringes 710 varies as a function of depth due to the varying concentration of donor material as a function of depth within controllably bandwidth-broadened hologram 700; in other words set of hologram fringes 710 comprises a first concentration of donor material nearest first surface 721 and the hologram fringes nearest second surface 722 comprise a second concentration of donor material. The variation of donor material as a function of depth within controllably bandwidth-broadened hologram 700 may comprise a continuous increase in donor material concentration from first surface 721 to second surface 722, a continuous decrease in donor material concentration from first surface 721 to second surface 722, or variation including increases and decreases in donor material concentration at varying depths within controllably bandwidth-broadened hologram 700. The varying concentration of donor material as a function of depth within controllably bandwidth-broadened hologram 700 may cause the fringe spacing of set of fringes 710 to vary as a function of depth.

Controllably bandwidth-broadened hologram 700 may comprise fixed photopolymer material. The concentration of donor material at first surface 721 may be less than, or in the alternative greater than, the concentration of fixed photopolymer at first surface 721. The concentration of donor material at second surface 722 may be less than, or in the alternative greater than, the concentration of fixed photopolymer at second surface 722. The variation in concentration of donor material within controllably bandwidth-broadened hologram 700 may cause the concentration of fixed photopolymer material within controllably bandwidth-broadened hologram 700 to vary.

Controllably bandwidth-broadened hologram 700 may comprise a wavelength-multiplexed hologram, where a wavelength-multiplexed hologram may be advantageously employed as a transparent holographic combiner in a full-color WHUD.

The broad angular bandwidth of controllably bandwidth broadened hologram 700 allows a wide range of incident angles and therefore a broad spatial distribution of exit pupils for a WHUD utilizing controllably bandwidth broadened hologram 700 as a holographic combiner. The wavelength-multiplexed hologram may comprise a red hologram, a green hologram, and a blue hologram. The wavelength-multiplexed hologram may further comprise an infrared hologram. An infrared hologram may be employed as a part of an eye-tracking system comprising a WHUD.

Figure 8:
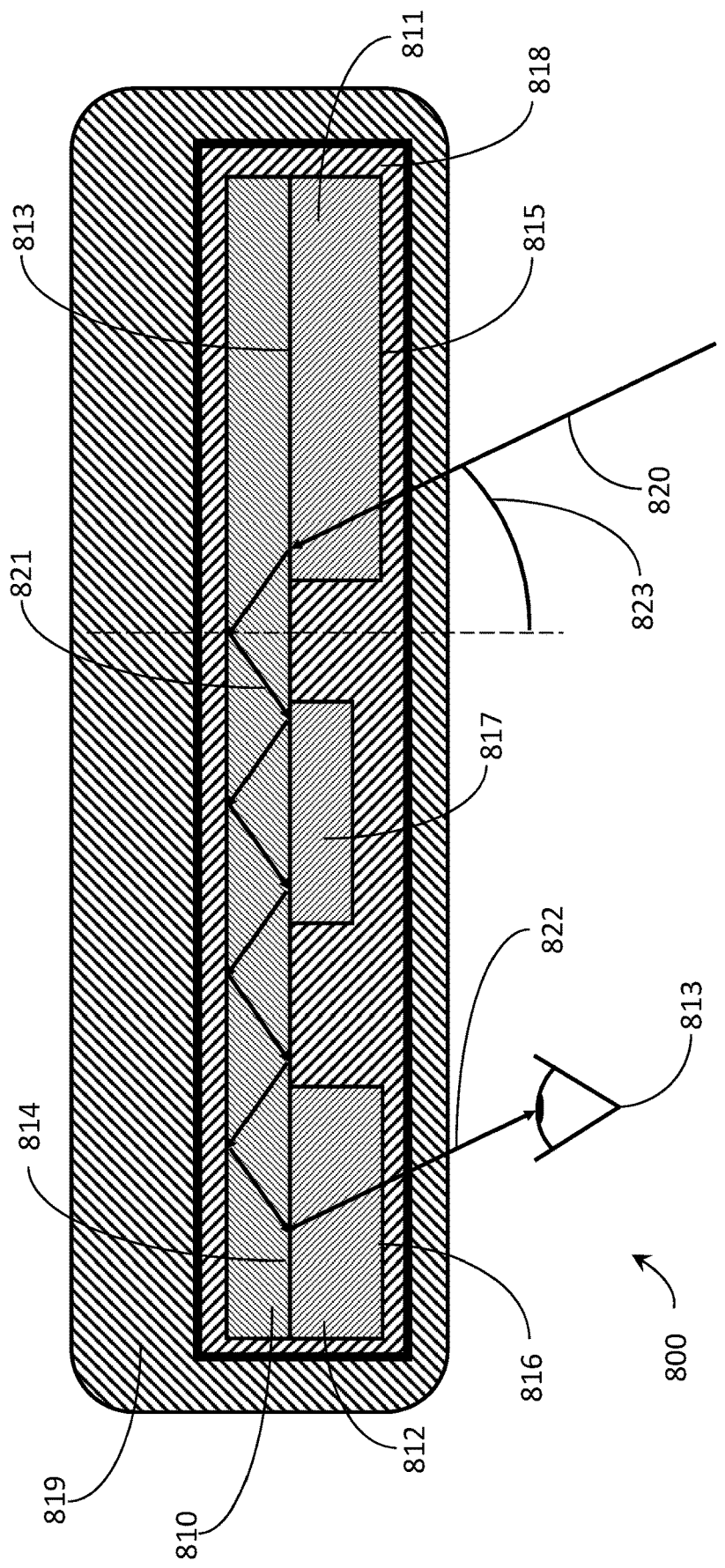
FIG. 8 is a cross-sectional view of an exemplary eyeglass lens with comprising a light guide and a hologram with controlled side lobes in accordance with the present systems, devices, and methods.

FIG. 8 is a cross-sectional view of an exemplary eyeglass lens 800 with comprising a light guide and a hologram with controlled side lobes in accordance with the present systems, devices, and methods. Eyeglass lens 800 comprises light guide 810, in-coupler 811, out-coupler 812, cladding layer 818 and lens layer 819.

Cladding layer 818 surrounds light guide 810, in-coupler 811, and GRIN-outcoupler 812. Cladding layer 818 comprises a low index material, where cladding layer may comprise a material with a refractive index of 1.5, 1.2, or 1.0. A lower refractive index is more advantageous as this increases the field of view of the light guide when the light guide is used as a display. A non-exclusive example of a cladding material with a refractive index of 1.5 is a plastic material (PET, acrylic, Nylon, etc.). A non-exclusive example of a cladding material with a refractive index of 1.2 is a layer of silica sol-gel. A non-exclusive example of a cladding material with a refractive index of 1.0 is air, where a cladding layer comprising air typically includes additional material to provide structural support to the light guide.

In-coupler 811 comprises first surface 813 and third surface 815. In-coupler 811 is physically coupled to light guide 810 at first surface 813; in-coupler 811 is positioned and oriented to redirect light into light guide 810. Out-coupler 812 comprises second surface 814 and fourth surface 816. Out-coupler 812 is physically coupled to light guide 810 at second surface 814; out-coupler 812 is positioned and oriented to redirect light out of light guide 810.

Beam of light 820 impinges on in-coupler 811 with incident angle 823 and is redirected into light guide 810 at an angle greater than the critical angle for light guide 810. Beam of light 820 is diffracted by incoupler 811 and is converted to guided light 821. Guided light 821 propagates through light guide 810 at an angle greater than the critical angle, bouncing off of the opposed surfaces of light guide 810 due to total internal reflection (TIR). Upon reaching out-coupler 812, guided light 821 is redirected out of light guide 810 to form redirected light 822; redirected light 822 is directed towards an eye of a user 813.

Eyeglass lens 800 may further comprise exit pupil expander 817; exit pupil expander 817 may be physically coupled to light guide 810. Exit pupil expander 817 may replicate guided light 821 to form additional beams of light, where the additional beams of light propagate to the out-coupler and may be redirected out of light guide 810 towards an eye of a user 813, expanding the eyebox of eyeglass lens 800 when eyeglass lens 800 is utilized in a wearable heads-up display. Light guide 810 may advantageously comprise a high index material.

Each of: in-coupler 811, out-coupler 812, and/or exit pupil expander 817, may comprise a hologram with controlled side lobes substantively similar to hologram with controlled side lobes 200. Eyeglass lens 800 may be similar in some ways to eyeglass lens 500. Eyeglass lens 800 may similar in some ways to eyeglass lens 630.

A person of skill in the art will appreciate that the various implementations or embodiments for holograms with controllably broadened bandwidth described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No.

14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, US Patent Application Publication No. 2016-0377866 A1 US, Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, U.S. Patent Application Publication No. US 2017-0068095 A1, US Patent Application Publication No. US 2017-0212290 A1, U.S. Provisional Patent Application Ser. No. 62/487,303, U.S. Provisional Patent Application Ser. No. 62/534,099, U.S. Provisional Patent Application Ser. No. 62/565,677, U.S. Provisional Patent Application Ser. No. 62/482,062, U.S. Provisional Patent Application Ser. No. 62/637,058, and U.S. Provisional Patent Application Ser. No. 62/680,449 are incorporated herein by reference, in their entirety. Aspects of the embodiments can be modified, if necessary, to employ systems, circuits and concepts of the various patents, applications and publications to provide yet further embodiments.

These and other changes can be made to the implementations or embodiments in light of the above-detailed description. In general, in the following claims, the terms used should not be construed to limit the claims to the specific implementations or embodiments disclosed in the specification and the claims, but should be construed to include all possible implementations or embodiments along with the full scope of equivalents to which such claims are entitled. Accordingly, the claims are not limited by the disclosure.

The invention claimed is:

1. A hologram with controllably broadened bandwidth, the hologram comprising:
    a first surface configured to accept light into the hologram;
    a second surface opposite the first surface; and
    a set of fringes disposed between the first surface and the second surface, wherein:
        the set of fringes having a first Bragg angle nearest the first surface;
        the set of fringes having a second Bragg angle nearest the second surface; and
        a Bragg angle of the set of fringes varies between the first surface to the second surface as a function of a depth between the first surface and the second surface,
        wherein at least one fringe of the set of fringes comprises a first portion configured to diffract incident light towards a first exit pupil and a second portion configured to diffract incident light towards a second exit pupil different from the first exit pupil.

2. The hologram of claim 1 wherein the hologram possesses an angular bandwidth of at least 18.5 degrees when illuminated with laser light with a wavelength equal to a center wavelength of the hologram.

3. The hologram of claim 1 wherein:
    the set of fringes possess a first slant angle nearest the first surface;
    the set of fringes possess a second slant angle nearest the second surface; and
    a slant angle of the fringes of the set of fringes varies between the first surface to the second surface.

4. The hologram of claim 1 wherein:
    the set of fringes possess a first fringe spacing nearest the first surface;
    the set of fringes possess a second fringe spacing nearest the second surface; and
    a fringe spacing of the fringes of the set of fringes varies between the first surface to the second surface.

5. The hologram of claim 1, further comprising: a donor material, wherein the fringes of the set of fringes that are nearest the first surface comprise a first concentration of donor material and the fringes of the set of fringes that are nearest the second surface comprise a second concentration of donor material.

6. The hologram of claim 5 wherein the first concentration of donor material is less than the second concentration of donor material.

7. The hologram of claim 5, further comprising: a photopolymer material, wherein the first concentration of donor material is less than a concentration of photopolymer material at the first surface.

8. The hologram of claim 1 wherein the hologram comprises a wavelength-multiplexed hologram.

9. The hologram of claim 8 wherein the wavelength-multiplexed hologram comprises a red hologram, a green hologram, and a blue hologram.

10. An eyeglass lens for use in a wearable heads-up display, the eyeglass lens comprising:
    a hologram comprising:
        a first surface configured to accept light into the hologram;
        a second surface opposite the first surface; and
        a set of fringes disposed between the first surface and the second surface; and
    at least one lens portion, wherein each lens portion is physically coupled to the hologram, and wherein:
        the set of fringes having a first Bragg angle nearest the first surface;
        the set of fringes having a second Bragg angle nearest the second surface; and
        a Bragg angle of the set of fringes varies between the first surface to the second surface as a function of a depth between the first surface and the second surface,
        wherein at least one fringe of the set of fringes comprises a first portion configured to diffract incident light towards a first exit pupil and a second portion configured to diffract incident light towards a second exit pupil different from the first exit pupil.

11. The eyeglass lens of claim 10 wherein the hologram possesses an angular bandwidth of at least 18.5 degrees when illuminated with laser light with a wavelength equal to a center wavelength of the hologram.

12. The eyeglass lens of claim 10 wherein:
    the set of fringes possess a first fringe spacing nearest the first surface;
    the set of fringes possess a second fringe spacing nearest the second surface; and
    a fringe spacing of the fringes of the set of fringes varies between the first surface to the second surface.

13. The eyeglass lens of claim 10, further comprising: donor material, wherein the fringes of the set of fringes nearest the first surface comprise a first concentration of donor material and the fringes of the set of fringes nearest the second surface comprise a second concentration of donor material.

14. The eyeglass lens of claim 13, further comprising: photopolymer material, wherein the first concentration of donor material is less than a concentration of photopolymer material at the first surface and wherein the second concentration of donor material is greater than a concentration of photopolymer material at the second surface.

15. The eyeglass lens of claim 10 wherein the set of fringes comprises a wavelength-multiplexed hologram.

16. The eyeglass lens of claim 15 wherein the wavelength-multiplexed hologram comprises a red hologram, a green hologram, and a blue hologram.

17. A wearable heads-up display (WHUD) with an expanded eyebox, the wearable heads-up display comprising:
    a support structure;
    a projector; and
    a transparent combiner positioned and oriented to appear in a field of view of an eye of a user when the support structure is worn on a head of the user, the transparent combiner comprising:
        a hologram comprising:
            a first surface;
            a second surface opposite the first surface;

a third surface opposite the second surface;
a first set of fringes disposed between the first surface and the second surface; and
a second set of fringes disposed between the second surface and the third surface; and
at least one lens portion, wherein each lens portion is physically coupled to the hologram, and wherein:
the first set of fringes having a first Bragg angle nearest the first surface;
the first set of fringes having a second Bragg angle nearest the second surface;
the second set of fringes having a third Bragg angle nearest the second surface;
the second set of fringes having a fourth Bragg angle nearest the third surface; and
a Bragg angle of the first set of fringes and the second set of fringes varies between the first set of fringes and the second set of fringes,
wherein at least one fringe of at least the first set of fringes comprises a first portion configured to diffract incident light towards a first exit pupil and a second portion configured to diffract incident light towards a second exit pupil different from the first exit pupil.

18. The WHUD of claim 17 wherein:
at least the first set of fringes is characterized by a first fringe spacing nearest the first surface;
at least the first set of fringes is characterized by a second fringe spacing nearest the second surface; and
a spacing of the fringes of at least the first set of fringes varies between the first surface to the second surface.

19. The WHUD of claim 17, wherein the hologram further comprises donor material, and wherein the fringes of the first set of fringes that are nearest the first surface comprise a first concentration of donor material, the fringes of the first set of fringes that are nearest the second surface comprise a second concentration of donor material, the fringes of the second set of fringes that are nearest the second surface comprise a third concentration of donor material, and the fringes of the second set of fringes that are nearest the third surface comprise a fourth concentration of donor material.

20. The WHUD of claim 19, wherein the hologram further comprises a photopolymer material, and wherein the first concentration of donor material is less than a concentration of photopolymer material at the first surface and wherein the second concentration of donor material is greater than the concentration of photopolymer material at the second surface.

21. The WHUD of claim 17 wherein at least the first set of fringes comprises a wavelength-multiplexed hologram.

22. The WHUD of claim 21 wherein the wavelength-multiplexed hologram comprises a red hologram, a green hologram, and a blue hologram.

23. The WHUD of claim 17 wherein the hologram possesses a total two-dimensional angular bandwidth 18.5 degrees when illuminated with laser light with a wavelength equal to a center wavelength of the hologram.

24. The WHUD of claim 23 wherein:
the projector includes an optical element arranged to replicate an image generated by the projector into at least two exit pupils, wherein each exit pupil originates from a respective one of N effective projector positions;
each of the N effective projector positions are positioned within a total two-dimensional angular range θ of the hologram; and
θ is less than 18.5 degrees.

25. The WHUD of claim 17 wherein the projector includes an optical element arranged to steer an exit pupil within a total two-dimensional angular range 8 of the hologram, and 8 is less than 18.5 degrees.

* * * * *